United States Patent [19]
Horimoto

[11] Patent Number: 5,857,713
[45] Date of Patent: Jan. 12, 1999

[54] COUPLING FOR HOSE AND METHOD OF MANUFACTURING THE SAME

[75] Inventor: Akira Horimoto, Tochigi-ken, Japan

[73] Assignee: Sakura Rubber Co., Ltd., Tokyo, Japan

[21] Appl. No.: 731,772

[22] Filed: Oct. 18, 1996

[30] Foreign Application Priority Data

Oct. 24, 1995 [JP] Japan ................................. 7-275835

[51] Int. Cl.$^6$ ................................................. F16L 35/00
[52] U.S. Cl. ................................. 285/81; 285/84; 285/87; 285/91; 285/114; 285/119; 285/352; 285/360; 285/906
[58] Field of Search ................................. 285/81, 82, 84, 285/85, 86, 91, 87, 114, 360, 361, 119, 376, 396, 401, 402, 68, 72, 73, 76–79, 156, 352, 906

[56] References Cited

U.S. PATENT DOCUMENTS

| | | | |
|---|---|---|---|
| 185,494 | 12/1876 | Chase | 285/352 X |
| 1,300,414 | 4/1919 | Klell | 285/73 X |
| 1,611,286 | 12/1926 | Shaff | 285/70 |
| 1,914,368 | 6/1933 | Goodall | 285/73 |
| 3,201,151 | 8/1965 | Westveer | 285/73 |
| 3,422,390 | 1/1969 | Tucker | 285/85 X |
| 4,523,778 | 6/1985 | Ebert | 285/73 |
| 4,643,459 | 2/1987 | Carson | 285/84 |
| 4,960,153 | 10/1990 | Bergsma | 285/361 X |
| 5,184,851 | 2/1993 | Sparling et al. | 285/79 X |
| 5,397,196 | 3/1995 | Boiret et al. | 285/376 X |
| 5,727,739 | 3/1998 | Hamilton | 285/361 X |

FOREIGN PATENT DOCUMENTS

| | | | |
|---|---|---|---|
| 60407 | 1/1939 | Norway | 285/156 |
| 9100469 | 1/1991 | WIPO | 37/248 |

*Primary Examiner*—Dave W. Arola
*Attorney, Agent, or Firm*—Volpe and Koenig, P.C.

[57] ABSTRACT

A coupling for coupling hoses comprising a pair of coupling main bodies that are structurally identical and undiscriminable for male and female. Each of said coupling main bodies is provided at the front end surface with a sealing surface for mutual abutment and at the front end with a plurality of engaging projections and engaging recesses, each of said engaging recesses being arranged between any two adjacent engaging projections, so that the engaging projections and the engaging recesses of the two coupling main bodies can be complementarily engaged with the corresponding engaging projections and engaging recesses of the other coupling main bodies. The engaging projections are provided with respective hooked anchor sections that are peripherally engaged to restrict axial movement and consequently couple the pair of coupling main bodies.

20 Claims, 20 Drawing Sheets

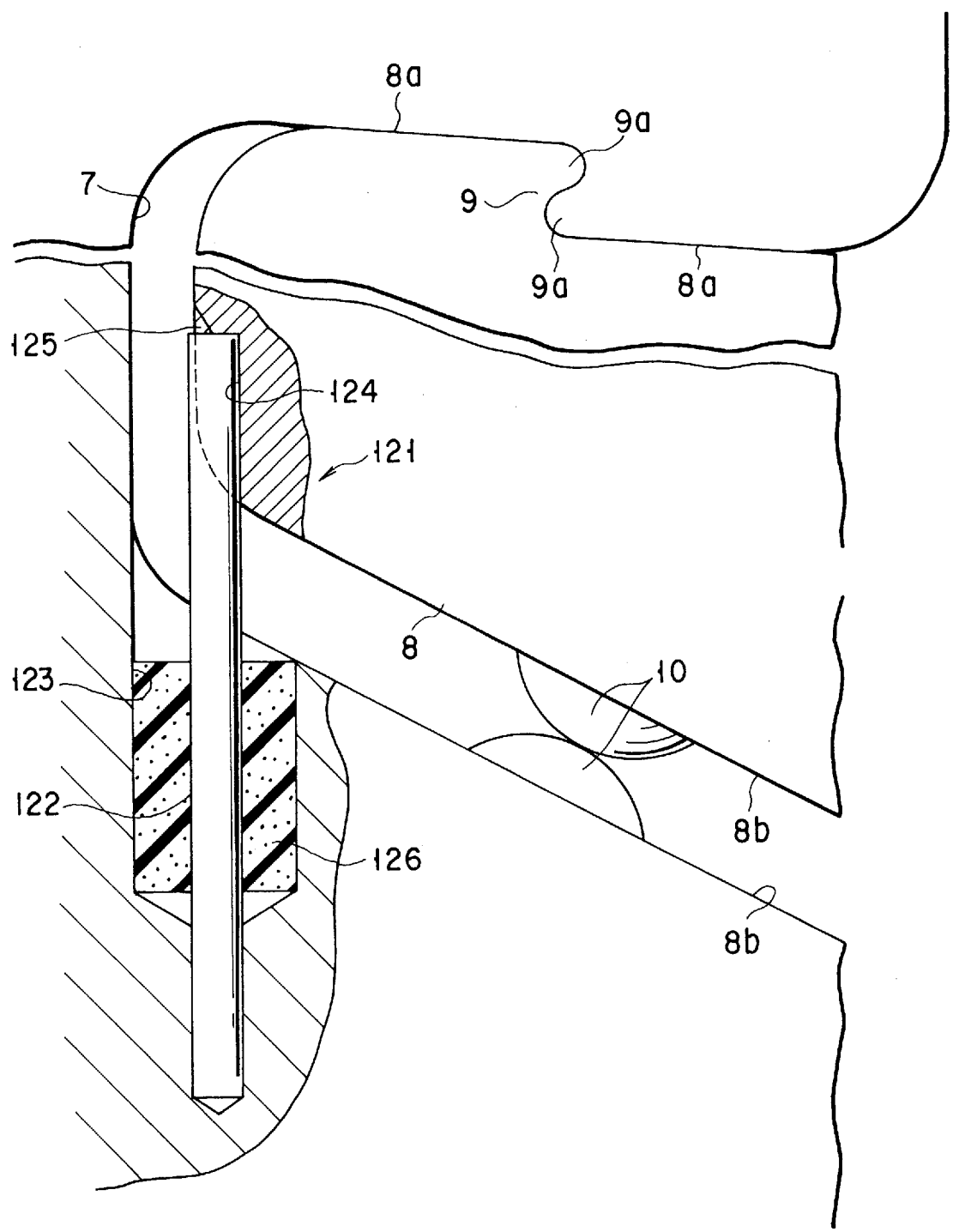
F I G. 15

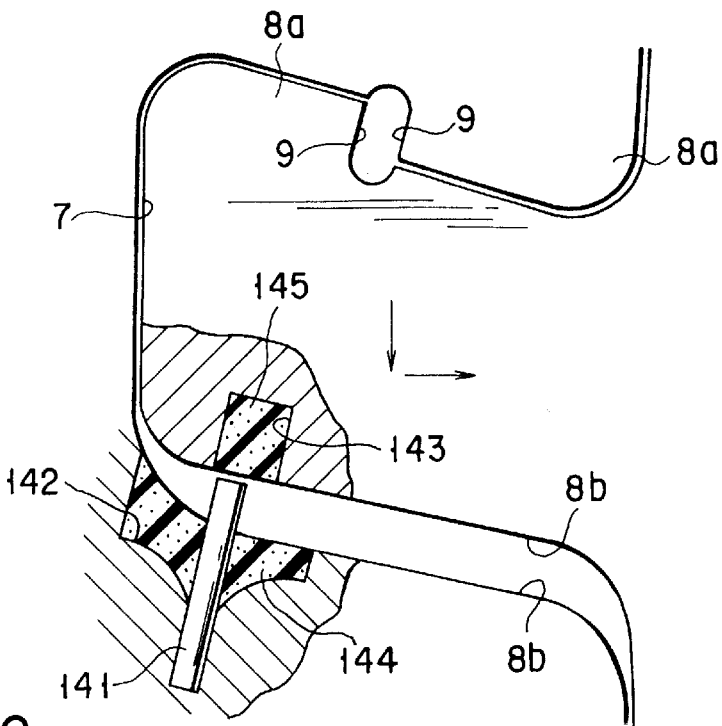
F I G. 18
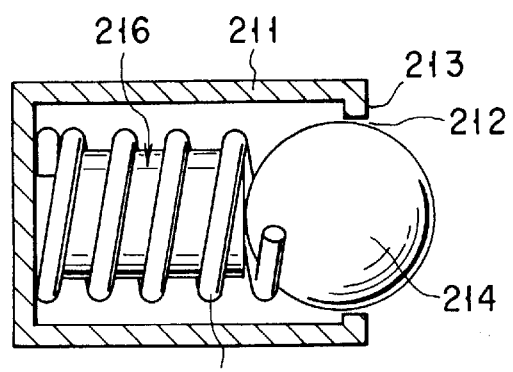
F I G. 20
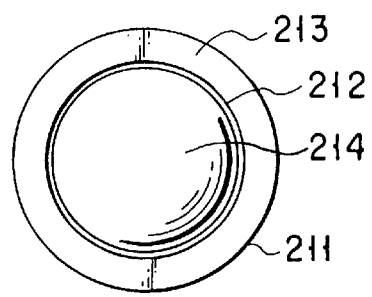
F I G. 21
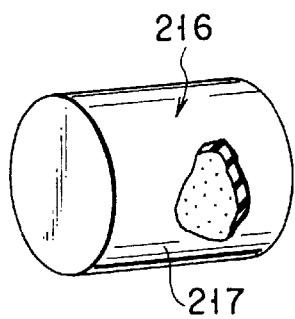
F I G. 22

COUPLING FOR HOSE AND METHOD OF MANUFACTURING THE SAME

BACKGROUND OF THE INVENTION

1. Field of the Invention

This invention relates to a coupling for connecting fire fighting hoses or the like or for connecting a hose and a pump or some other apparatus and to a method of manufacturing such a coupling. More particularly, the present invention relates to a coupling comprising a pair of coupling main bodies that are structurally identical and not discriminable as male and female and to a method of manufacturing such a coupling.

2. Description of the Related Art

Plug-in type couplings for connecting hoses including fire fighting hose are known. A plug-in type coupling of the type under consideration typically comprises a pair of coupling main bodies that are to be brought into axial engagement with each other to connect hoses. Such a plug-in type coupling is defined by Japanese Industrial Standards JIS B 9911 and referred to "Machino-shiki coupling", which is currently very popular.

Such a plug-in type coupling can connect and release hoses with simple operation and hence is advantageously used as a coupling for connecting fire fighting hoses that requires an enhanced level of fast and reliable operability.

However, such a known plug-in type coupling comprises a pair of coupling main bodies that are discriminable as male and female. In other words, a plug-in type coupling is comprised of a male metal fitting and a female metal fitting and two male or female metal fittings cannot be brought into engagement if they are put together. Thus, there arises a problem when fire breaks out and fire fighting hoses have to be connected for extension that male or female metal fittings are put together for hose connection by mistake. This is a problem that should preferably be totally eliminated for fast and reliable fire fighting operations. Additionally, such a known plug-in type coupling is costly because two structurally different metal fittings, a male metal fitting and a female metal fitting, have to be manufactured for it.

SUMMARY OF THE INVENTION

In view of the above identified problems of known plug-in type couplings, it is therefore an object of the present invention to provide a plug-in type coupling comprising a pair of complementary coupling main bodies that are structurally identical and hence not discriminable for male and female and can connect and release hoses with simple operation in addition to that they are structurally simple and reliable and can be manufactured at reduced cost.

According to the invention, the above object and other objects are achieved by providing a coupling comprising a pair of coupling main bodies having respective sealing front surfaces that are brought into axial abutment with each other when the main bodies are put together. Each of the coupling main bodies is provided with a plurality of engaging axial projections and a plurality of engaging axial recesses that are arranged peripherally and alternately. The engaging projections and the engaging recesses of the paired coupling main bodies are complementary relative to each other so that they become engaged interdigitally when they are put together. Additionally, each of the engaging projections is provided with a hooked anchor section to be peripherally secured to the corresponding engaging projection of a matching coupling main body in order to hold the paired coupling main bodies together and prohibit their mutual axial movement.

Thus, the paired coupling main bodies of a coupling according to the invention are structurally identical and complementary so that they can be coupled with each other without discrimination of male and female. Additionally, the coupling main bodies can be coupled with each other with simple operation of axially leading the engaging projections of one of the main bodies into the respective engaging recesses of the other main body for mutual engagement. Such paired coupling main bodies are structurally simple and identical and hence they are highly reliable.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 11 is an enlarged partial plan view of the sixth embodiment of FIG. 10, showing the locking mechanism the of;

FIG. 15 is an enlarged partial plan view of a seventh embodiment of the invention, showing the locking mechanism thereof;

FIG. 17 is an enlarged partial plan view of the eighth embodiment of the invention similar to FIG. 17 but showing the locking mechanism thereof in still another different state;

FIG. 18 is a partially cut away lateral view of a ninth embodiment of the invention, showing a part thereof in longitudinal cross section;

FIG. 20 is a longitudinal sectional view of the plunger of the urging mechanism of the embodiment of FIG. 10;

FIG. 21 a front view of the plunger of FIG. 20;

FIG. 22 is a perspective view of the viscous body of the plunger f FIG. 20;

DETAILED DESCRIPTION OF THE PREFERRED EMBODIMENTS

Figure 1:
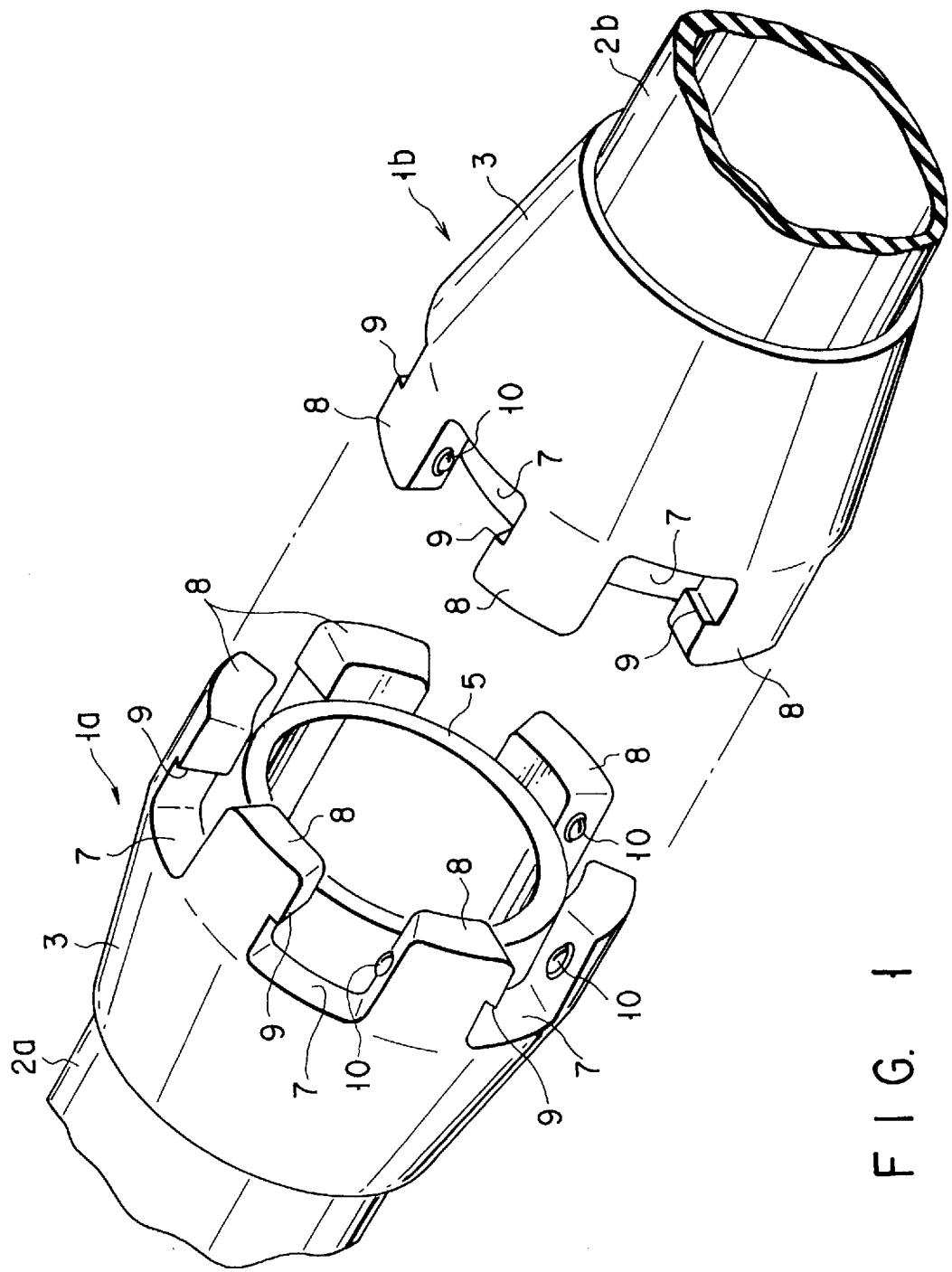
FIG. 1 is a perspective view of a first embodiment of the invention.
Figure 2:
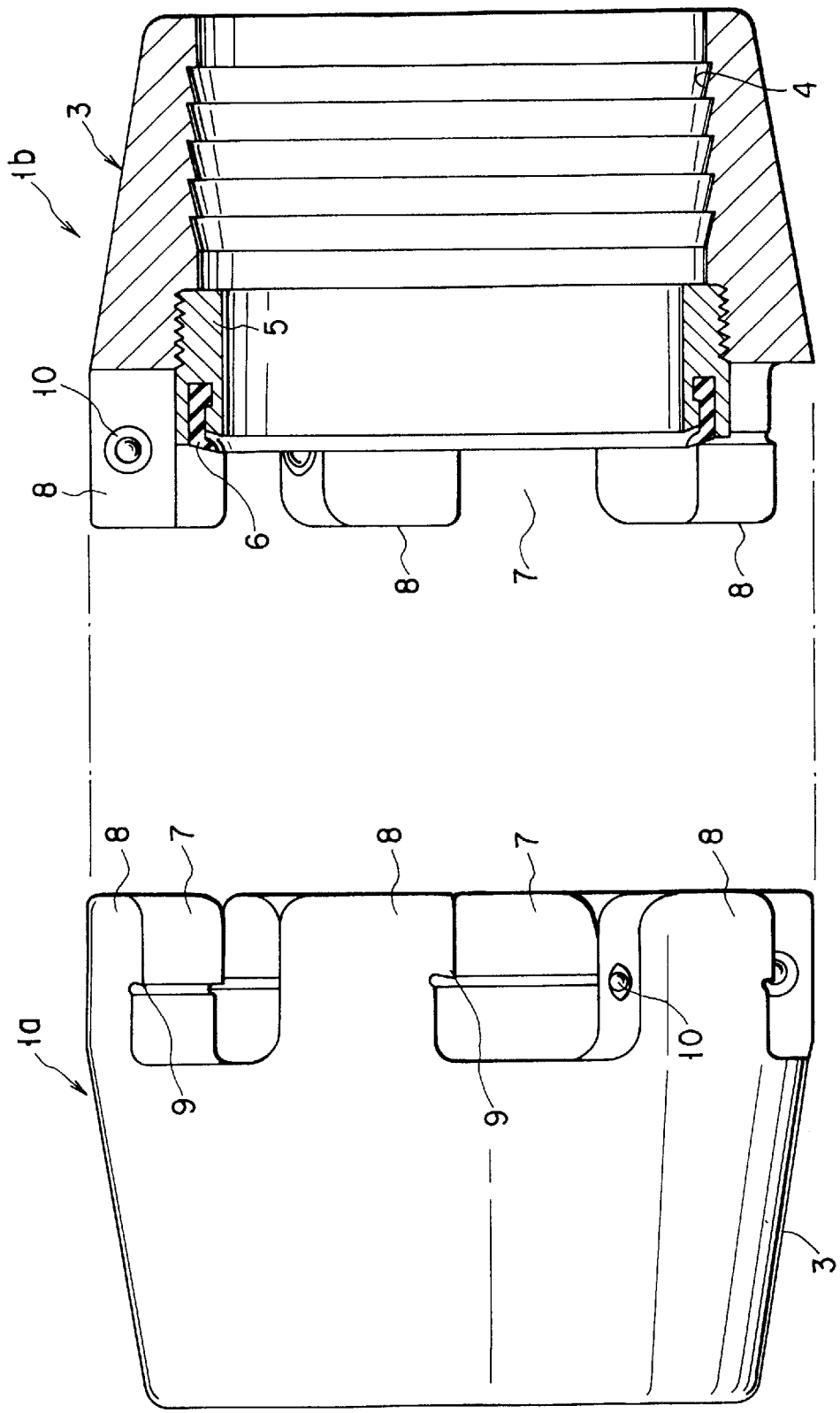
FIG. 2 is a partially cut away lateral view of the first embodiment of FIG. 1, showing a part thereof in longitudinal ross section.
Figure 3:
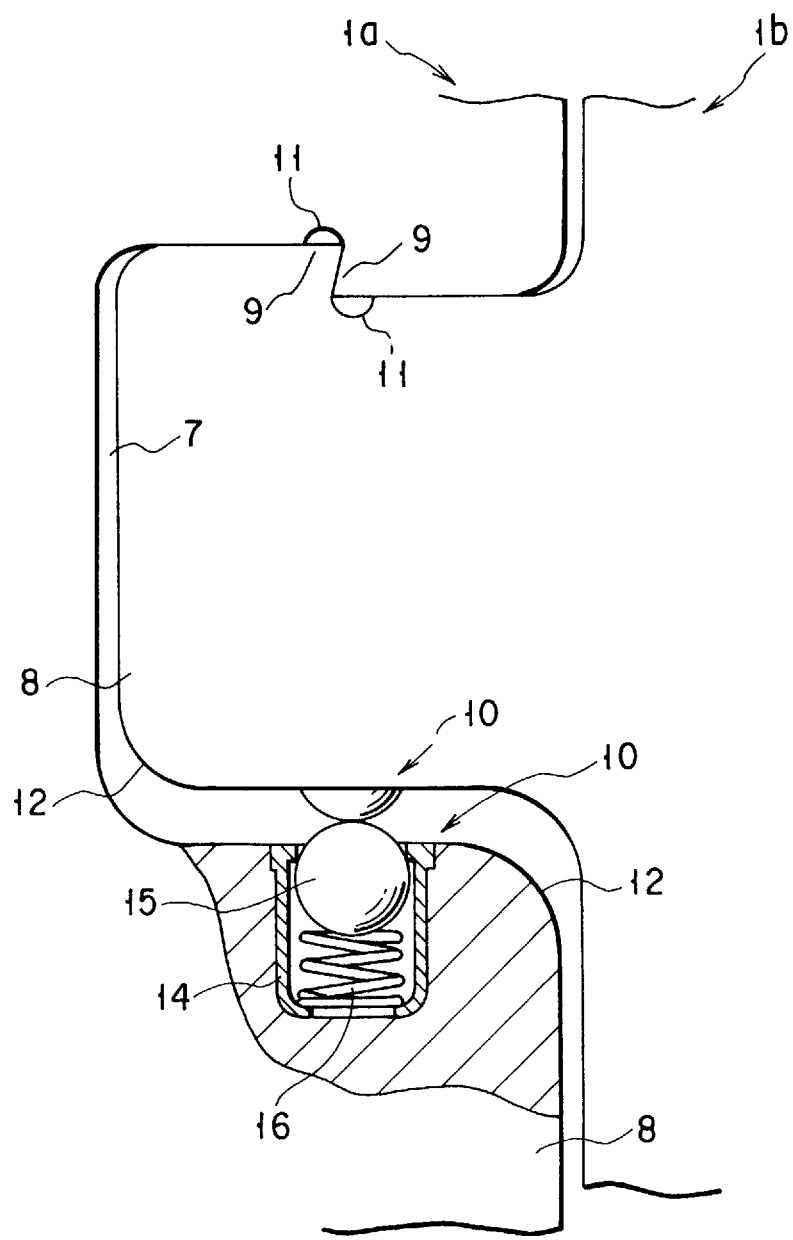
FIG. 3 is an enlarged partial plan view of the first embodiment of FIG. 1.

Now, the present invention will be described by referring to the accompanying drawings that illustrate preferred embodiments of the invention, which are designed for use with fire fighting hoses. FIGS. 1 through 3 illustrate a first embodiment of the invention. The embodiment of coupling comprises a pair of coupling main bodies 1a and 1b, which are securely fitted to respective fire fighting hoses 2a and 2b.

Each of the coupling main bodies 1a and 1b has a substantially cylindrical tube main body 3 provided on the inner peripheral surface with an indented hose fitting section 4. The front ends of the fire fighting hoses 2a and 2b are led into the respective hose fitting sections 4 and pressed against the latter from the inside by respective caulking rings (not shown) so that the outer surfaces of the coupling main bodies 1a and 1b are held in sealing contact with the inner surfaces of the respective hose fitting sections 4.

A cylindrical sealing surface carrying member 5 is screwed onto the inner peripheral surface of each of the tube main bodies 3 at the front end of the latter, the front end of the cylindrical sealing surface member operating as sealing surface, and a sealing member 6 which is typically a rubber packing is fitted to the sealing surface. Thus, when the coupling main bodies 1a and 1b are brought into axial engagement, their sealing members 6 and 6 abut each other to make the insides of the tube main bodies 3 and 3 communicate with each other and keep them hermetically sealed relative to the outside.

Each of the tube main bodies 3 and 3 has at the front end thereof a plurality of, e.g., six, engaging projections 8 that are integral with the tube main body. The engaging projections 8 are peripherally arranged at regular intervals and axially project from the sealing surface of the sealing surface carrying member 5. The gaps separating the engaging projections 8 operate as so many engaging recesses 7 so that, when the coupling main bodies 1a and 1b are axially put together, the engaging projections 8 of the coupling main body 1a are received by the respective engaging recesses 7 of the coupling main body 1b while the engaging projections 8 of the coupling main body 1b are received by the respective engaging recesses 7 of the coupling main body 1a for complementary or interdigital engagement.

Note that the engaging recesses 7 has a width slightly greater than that of the engaging projections 8 in the first embodiment so that the engaging projections 8 may be peripherally slidable by a given distance when the engaging projections 8 and the engaging recesses 7 are brought into axial engagement.

Each of the engaging projections 8 is provided on one of the lateral sides (hereinafter referred to as the first lateral side) thereof with a stepped and hooked anchor section 9 to be peripherally engaged with the stepped and hooked anchor section 9 of the corresponding engaging projection of the other coupling main body. Therefore, as the coupling main bodies 1a and 1b are put together to make the engaging projections 8 to be received by the respective engaging recesses 7 for axial engagement and then rotated relative to each other to bring the first lateral side of each of the engaging projections 8 close to the corresponding first lateral side of the corresponding engaging projection 8 of the other coupling main body, the hooked anchor sections 9 of the two engaging projections 8 are axially engaged with each other to securely connect the coupling main bodies 1a and 1b as shown in FIG. 3. Each of the hooked anchor sections 9 is provided at a base portion thereof with a curved section 11 for preventing any accumulation of stress from occurring in the engaging projection. Additionally, each of the engaging projections 8 is provided at the front end corner of the other one of the lateral sides (hereinafter referred to as the second lateral side) thereof with an arcuate guide section 12 so that the guide sections 12 of each pair of mated engaging projections 8 abut each other as the coupling main bodies 1a and 1b are put together for mutual engagement.

Each of the engaging projections 8 is still additionally provided on the second lateral side with an urging mechanism 10 which is a plunger mechanism comprising an urging member such as a steel ball 15 protrusibly housed in a cylindrical casing member 14 and a spring 16 for urging the steel ball 15 to protrude, the urging member 10 being buried in the second lateral side of the engaging projection 8. Thus, as the engaging projections 8 are received by the corresponding engaging recesses 7, the steel balls 15 of each pair of mated engaging projections 8 abut and push each other to urge the second lateral sides of the projections 8 to move away from each other so that the first lateral side of each of the engaging projections 8 is urged to come close to the corresponding lateral side of the other adjacently located engaging projection 8 and the hooked anchor sections of these adjacently located engaging projections 8 come into mutual engagement.

The above described embodiment of coupling operates in a manner as described below. To connect the coupling main bodies 1a and 1b with each other, they are placed vis-a-vis in a substantially coaxial state as shown in FIG. 1 and then put together in such a way that the engaging projections are received by the respective engaging recesses 7. Since the engaging projections 8 having an identical profile and arranged with regular intervals, they may be received by any engaging recesses 7. Thus, if the number of engaging projections 8 is six on each coupling main body, they can be brought into engagement with the corresponding engaging recesses 7 by rotating the coupling main bodies 1a and 1b by about 30° at most relative to each other. In other words, the fire fighting hoses 2a and 2b connected to the respective coupling main bodies 1a and 1b do not have to be subjected to excessive twisting motion to bring the coupling main bodies into mutual engagement.

As the coupling main bodies 1a and 1b are engaged with each other, the front end of the first lateral side of each engaging projection 8 abuts the front end of the corresponding first lateral side of the corresponding engaging projection 8 so that practically no gap is left between the oppositely disposed second lateral sides. However, since a guide section 12 is arranged at the front end corner of the second lateral side of each engaging projection 8 and the oppositely disposed arcuate guide sections 12 abut and smoothly guide each other, the front ends of the engaging projections 8 are not inappropriately caught halfway toward the respective fully engaged positions. As the mated engaging projections 8 come into axial engagement, the steel balls 15 of the urging mechanisms 10 arranged on the second lateral sides push each other to urge the first lateral sides of the engaging projections 8 to come close to each other. Once the hooked anchor section 9 arranged on the first lateral side of each of the engaging projections override the front end of the mate, the mated hooked anchor sections 9 are urged by their urging mechanisms to come into peripheral engagement with each other as shown in FIG. 3, where they are not axially movable, so that consequently the paired coupling main bodies 1a and 1b are firmly connected to each other. Under this condition, the sealing members 6 are deformed to a certain extent under pressure to maintain the sealed condition of the coupling main bodies 1a and 1b as described earlier.

The coupled coupling main bodies 1a and 1b can be released from each other by rotating them in the opposite directions with hands against the urging force of the urging mechanisms 10 until the hooked anchor sections 9 that are in a locked state become unlocked and simultaneously pulling the coupling main bodies 1a and 1b away from each other.

Since the paired coupling main bodies 1a and 1b of the above first embodiment are structurally and dimensionally identical, they can be connected to each other for certain without discriminating if they are male or female so that they may be fitted to the both ends of a hose or the delivery pipe of a pump. There can be no mistaking a male main body for a female main body or vice versa, leading to mismatched abortive coupling. Additionally, since the coupling main bodies 1a and 1b are structurally identical, they can be manufactured at reduced cost.

The engaging projections 8 of the above embodiment can be handled with ease because they are received by the respective engaging recesses 7 with a peripheral gap and allowed to show a little displacement. The peripheral gap between adjacent engaging projections 8 also prevents them from being blocked against mutual engagement by foreign objects such as grains of sand and, therefore, the coupling can be operated with an enhanced level of reliability.

Figure 4:
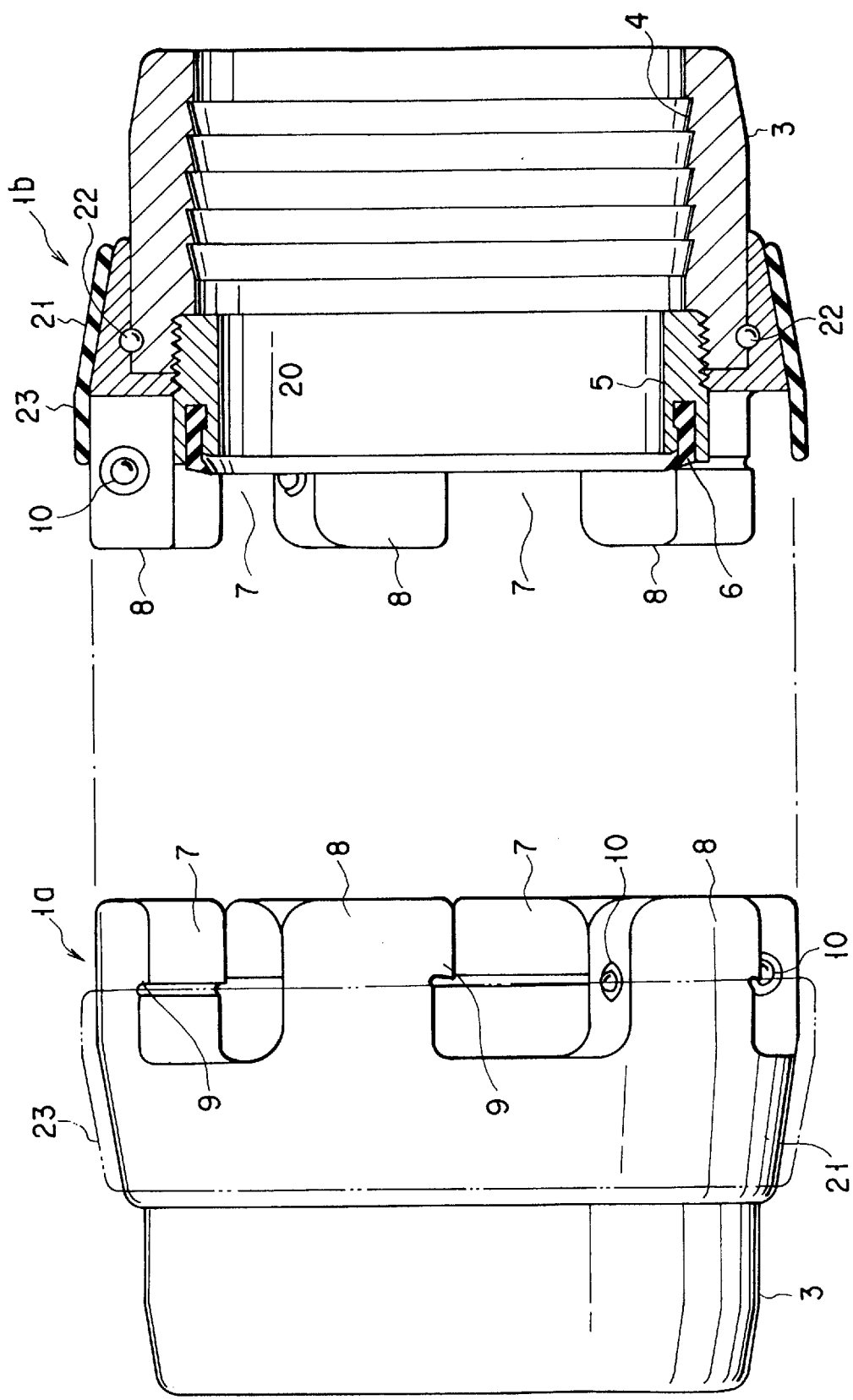
FIG. 4 is a partially cut away lateral view of a second embodiment of the invention, showing a part thereof in longitudinal cross section.

FIG. 4 shows a second embodiment of the invention. In this embodiment, the tube main body 3 and the sealing surface carrying member 5 of each coupling main body are coupled together by means of respective threaded sections 20 and an annular engaging member 21 having engaging projections 8 and engaging recesses 7 is rotatably fitted to the tube main body 3 with balls 22 arranged therebetween. The balls for linking the engaging member 21 and the tube main body 3 may be replaced by an annular ring or some other appropriate means.

The coupling main body of the second embodiment is provided with a cylindrical cover boot 23 typically made of synthetic rubber that surrounds the outer peripheries of the engaging projections 8 and the engaging recesses 7. The cover boot 23 has a length so selected that its front edge exactly abuts that of the cover boot of the corresponding coupling main body when the mated coupling main bodies 1a and 1b are coupled in position.

Since this embodiment is otherwise identical with the first embodiment, its components are respectively denoted by the same reference symbols as those of the first embodiment and will not be described any further.

Since the engaging member 21 having engaging projections 8 and engaging recesses 7 is rotatable relative to the tube main body 3 in this embodiment, the fire fighting hoses 2a and 2b do not have to be twisted at all to bring the engaging projections 8 and the engaging recesses of the two coupling main bodies into mutual engagement and therefore the main bodies can be handled with ease. Additionally, the cover boots 23, 23 of the coupling main bodies 1a and 1b effectively prevent foreign objects from entering the gaps between the engaging projections 8 and the corresponding engaging recesses 7.

Figure 5:
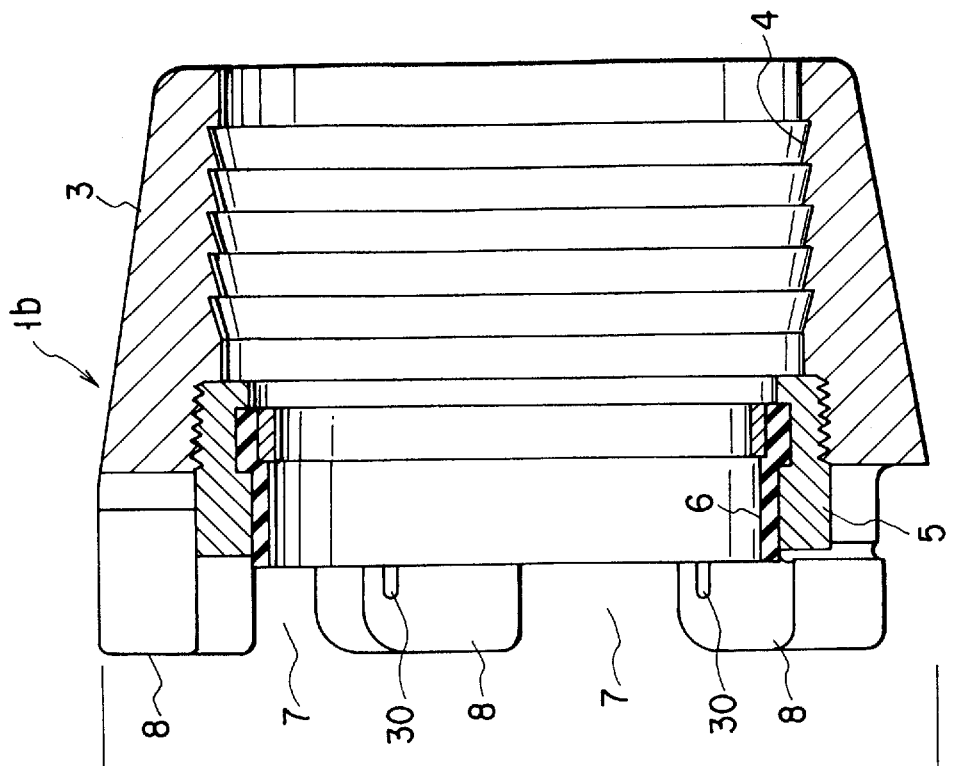
FIG. 5 is a partially cut away lateral view of a third embodiment of the invention, showing a part thereof in longitudinal cross section.
Figure 5:
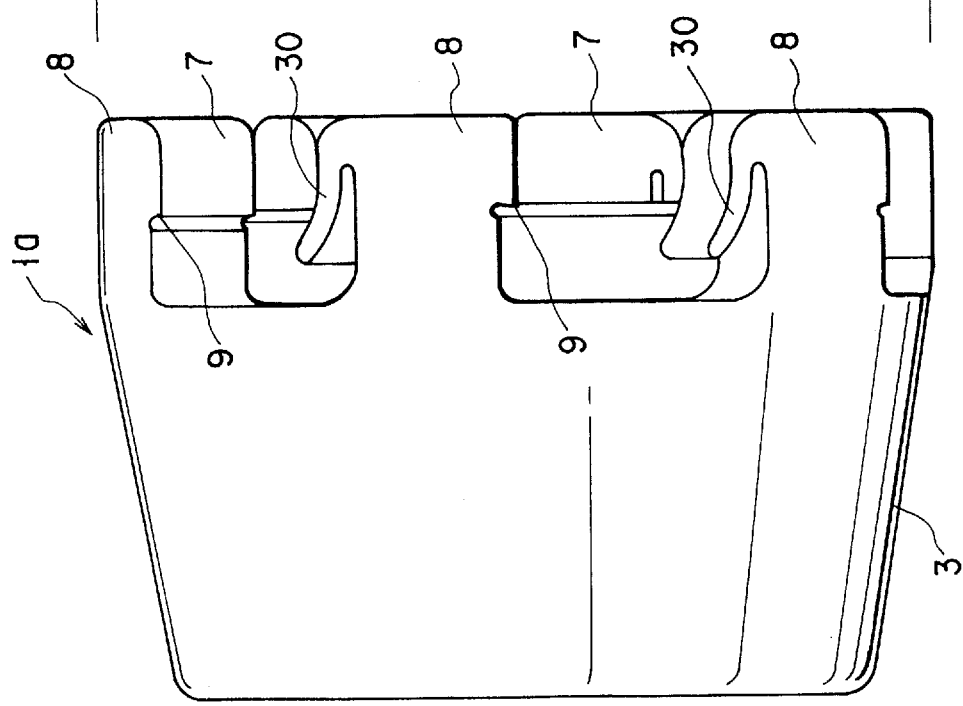

FIG. 5 shows a third embodiment of the invention. In this embodiment, each of the engaging projections 8 is provided on the second lateral side thereof with an integral resilient piece 30. The resilient piece 30 is formed by partly cutting the wall of the second lateral side of the engaging projection 8 to show resiliency. As the coupling main bodies 1a and 1b are brought into mutual engagement, the resilient piece 30 of each of the engaging projections 8 abut that of the corresponding engaging projection 8 to urge the first lateral side thereof to come close to that of the other corresponding engaging projection 8 until their hooked anchor sections 9 are mutually engaged with each other. Thus, the resilient piece 30 is equivalent to the urging mechanism of the first embodiment.

Since the resilient piece 30 of this embodiment is integral with the coupling main body, the latter is structurally further simplified. This embodiment is otherwise identical with the first embodiment and, therefore, its components are respectively denoted by the same reference symbols as those of the first embodiment and will not be described any further.

Figure 6:
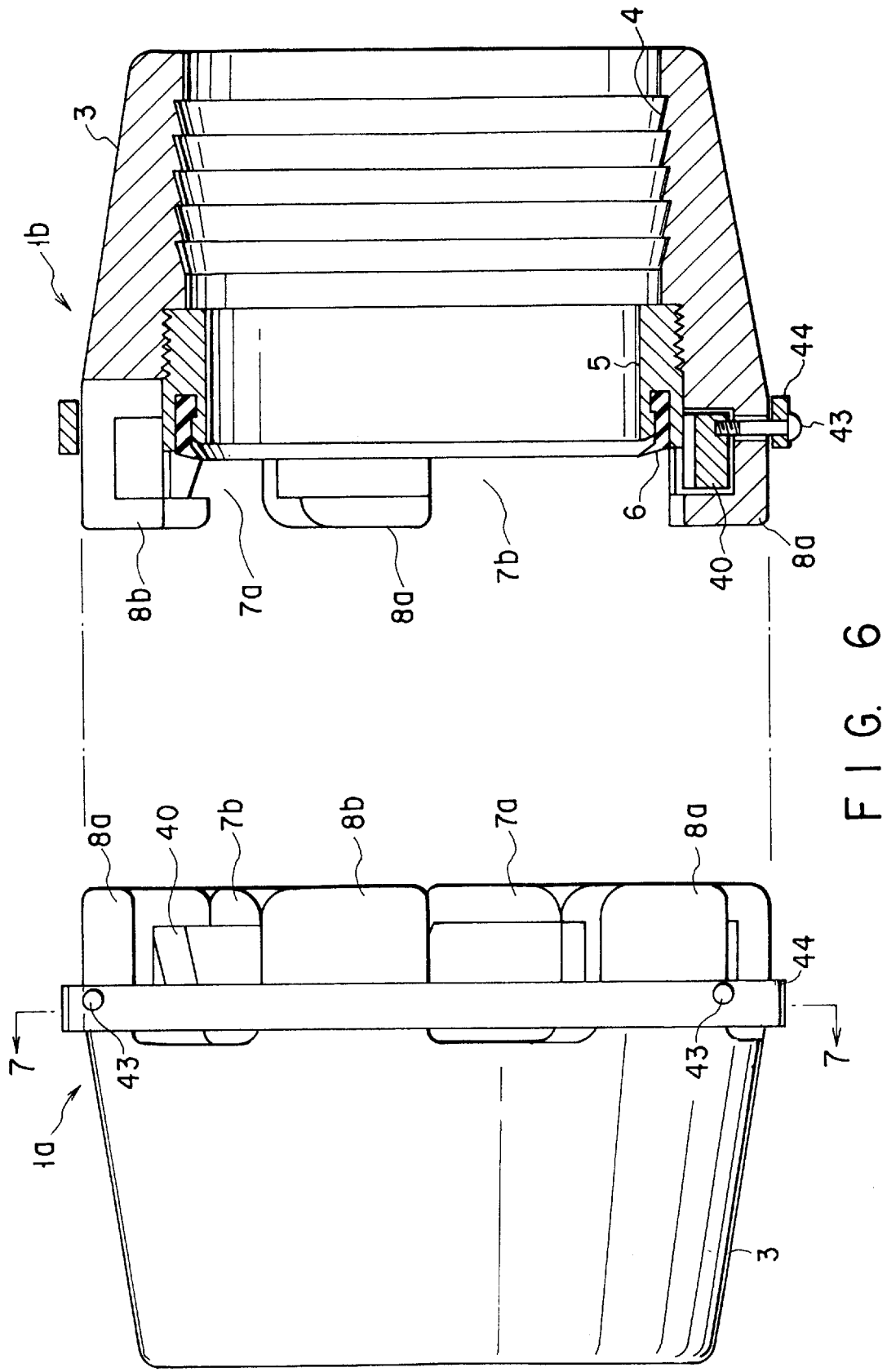
FIG. 6 a partially cut away lateral view of a fourth embodiment of the invention, showing a part thereof in longitudinal cross section.
Figure 7:
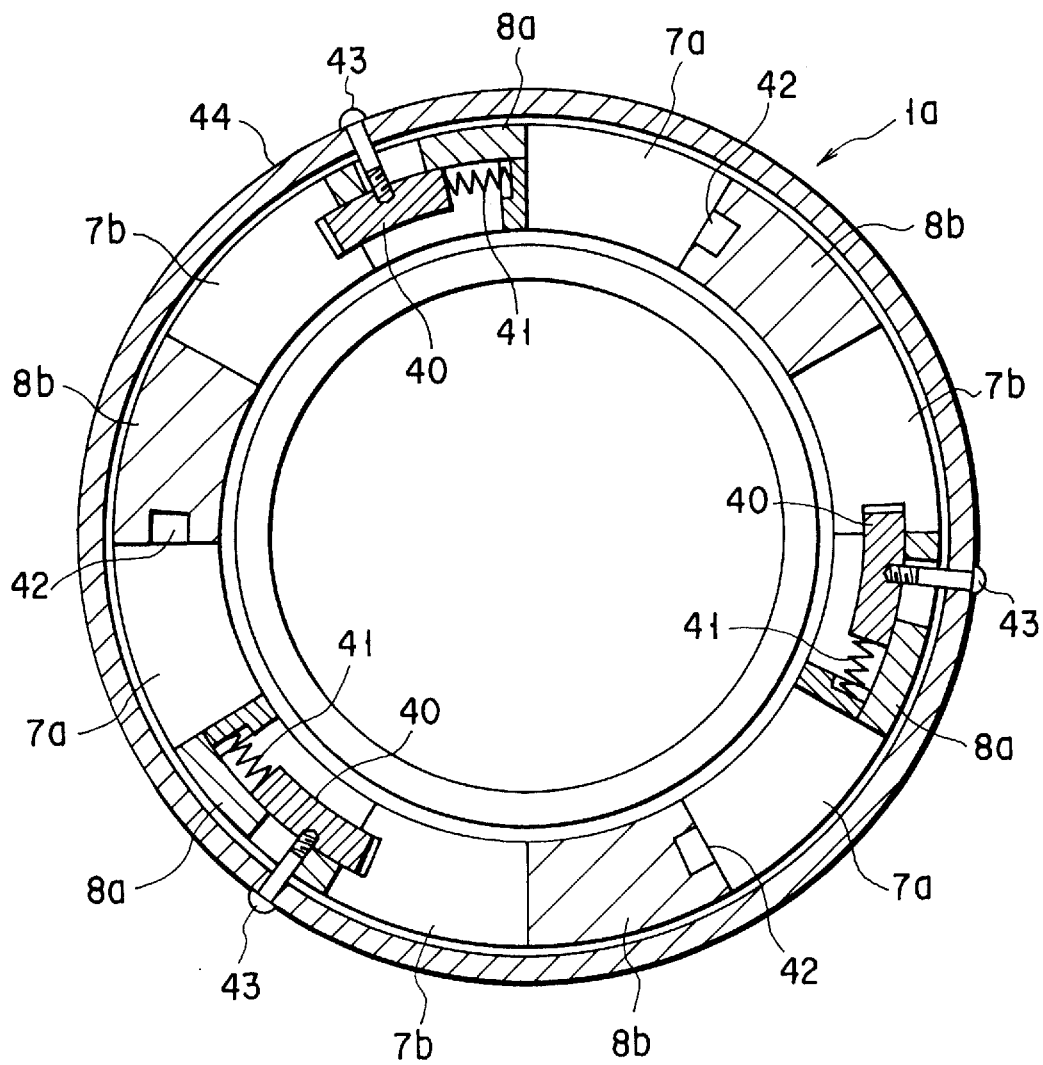
FIG. 7 is a transversal cross sectional view of the fourth embodiment taken along line 7—7 in FIG. 6.

FIGS. 6 and 7 show a fourth embodiment of the invention. While this embodiment comprises engaging projections 8a and 8b and engaging recesses 7a and 7b but they do not practically show any peripheral gaps therebetween when the two coupling main bodies are put together for mutual engagement. There are alternately arranged three anchoring engaging projections 8a and three receiving engaging projections 8b on each coupling main body. Each of the anchoring engaging projections 8a is provided in the inside with a peripherally protrusible anchor member 40, which is urged to protrude by a spring 41. The anchor member 40 has an tilted front end surface.

The outer peripheries of the engaging projections 8a and 8b are surrounded by a release ring 44, which is an annular member to which each of the anchor members 40 is linked by means of a bolt 43.

Each of the receiving engaging projections 8b is provided on a lateral side thereof with a anchor member receiving hole 42 for receiving the front end of the corresponding anchor member 40. This fourth embodiment is otherwise identical with the first embodiment and, therefore, its components are respectively denoted by the same reference symbols as those of the first embodiment and will not be described any further.

The fourth embodiment of coupling according to the invention operates as follows. As the coupling main bodies 1a and 1b are put together to bring the engaging projections 8a and 8b and the engaging recesses 7a and 7b into mutual engagement, each of the engaging recesses 7a receives the corresponding anchoring engaging projection 8a and each of the engaging recesses 7b receives the corresponding receiving engaging projections 8b. Then, the tilted front end surface of the anchor member 40 of the anchoring engaging projection 8a abuts the front end of the corresponding receiving engaging projection 8b to push the anchor member 40 into the anchoring engaging projection 8a against the urging force of the spring 41. However, as the engaging projections 8a and 8b and the engaging recesses 7a and 7b are brought into complete mutual engagement, the front end of the anchor member 40 is urged by the spring 41 to protrude into the anchor member receiving hole 42 of the corresponding receiving engaging projection 8b. Thus, the coupling main bodies 1a and 1b are mutually engaged with each other. The mutually engaged coupling main bodies 1a and 1b can be released from each other by rotating the release ring 44 to push back the anchor member 40 into the engaging projection until the locked relationship between it and the anchor member receiving hole 42 is undone.

This embodiment is characterized by the strong coupling effect it can produce because the engaging projections 8a and 8b are tightly received by the respective engaging recesses 7a and 7b without any peripheral gaps between them and the anchor members 40 are securely held in the respective anchor member receiving holes not moved relative to each other for releasing them from each other.

These characteristic features of this embodiment are particularly advantageous when the embodiment is used for electric connectors for telecommunications between fire fighters or signal or power supply lines because the coupling main bodies 1a and 1b are only axially moved and not rotated relative to each other for coupling them or releasing them from each other. A pair of matching electric connectors of any known type can be connected to each other by arranging them respectively in the coupling main bodies 1a and 1b and bringing the latter into mutual engagement.

However, it should be noted that such electric connectors may also be used with the first or third embodiment, wherein the coupling main bodies 1a and 1b are rotatable relative to each other.

Figure 8:
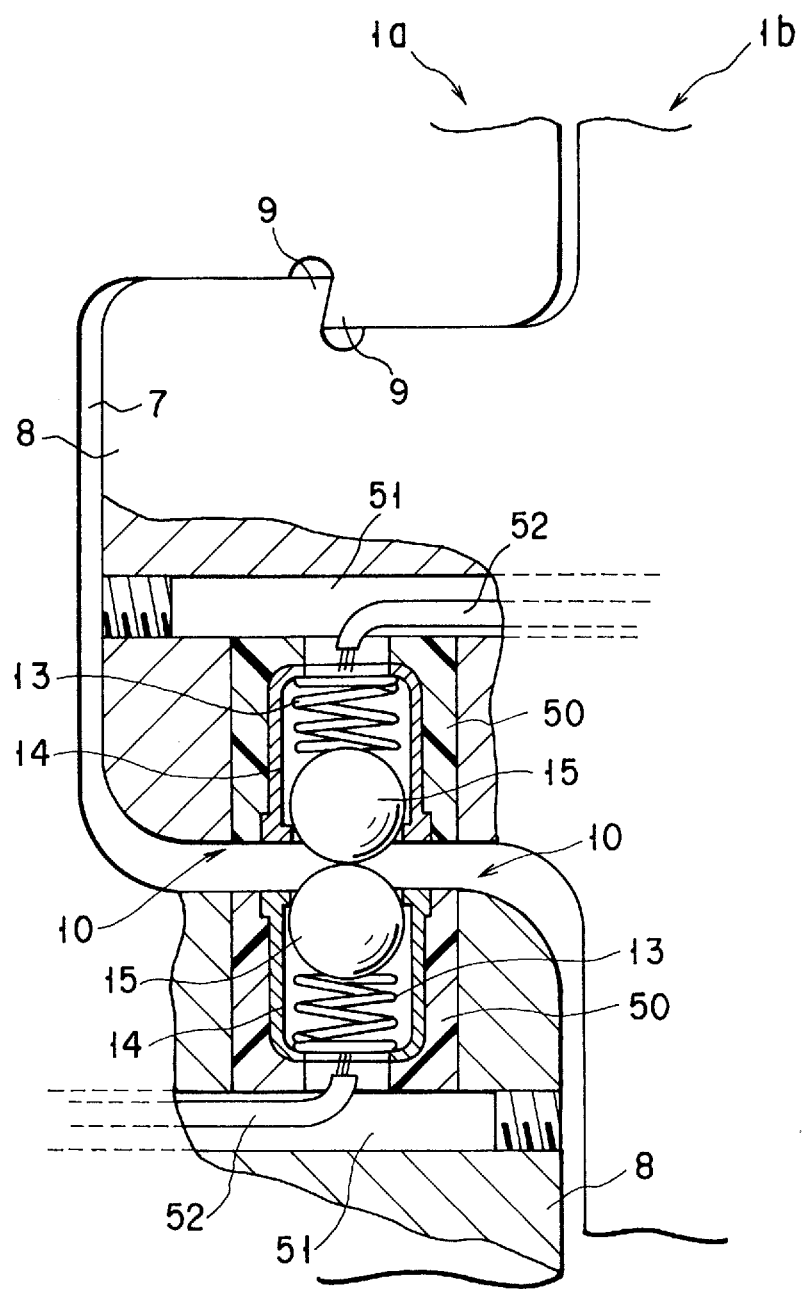
FIG. 8 a partial plan view of a fifth embodiment of the invention.

FIG. 8 is a partial plan view of a fifth embodiment of the invention obtained by modifying the first embodiment so as to have it provided with electric connectors. In this embodiment, an urging mechanism 10 of the above described type is buried in each of the engaging projections 8 with an insulation sleeve 50 of a synthetic resin material disposed therebetween. Each of the engaging projections 8 is also provided with a through hole 51, through which a wire 52 is arranged to electrically connect the steel ball 15 of the urging mechanism 10 to the outside. The steel ball 15 is used as a contact electrode and an electric through path is established as the steel balls 15, 15 of the urging mechanisms 10, 10 of the mated engaging projections 8 come into contact with each other.

Each of the coupling main bodies of this embodiment comprises six engaging projection 8. If they are divided into two groups each having three engaging projections and the contact electrodes of the first group and those of the second group are referred to as the first and second electrodes respectively, the first and second electrodes of the mated engaging projections provide two electric paths when the coupling main bodies 1a and 1b are brought into mutual engagement. Alternatively they may be so arranged that all the urging mechanism 10 of the six engaging projection 8 are used as the first electrode while the engaging projections 8 serve as grounding electrodes.

If the coupling is under internal hydraulic pressure, the coupling main bodies are subjected to a large axial load that tends to separate them from each other and borne by the hooked anchor sections. In other words, the coupling main bodies are not unintendedly released from each other if its inside is under pressure.

However, once the internal pressure is relieved, the hooked anchor sections are held in the locked condition only by the urging force of the urging mechanism. Therefore, if the coupling is not under internal pressure and subjected to an external impact or load such as a force trying to twist the hoses, the coupling main bodies can be rotated relative to each other to undo the locked engagement of the hooked anchor sections and eventually separate the coupling main bodies from each other.

In order to eliminate this problem, a coupling according to the invention is preferably provided with locking mechanisms as will be described hereinafter.

Figure 9:
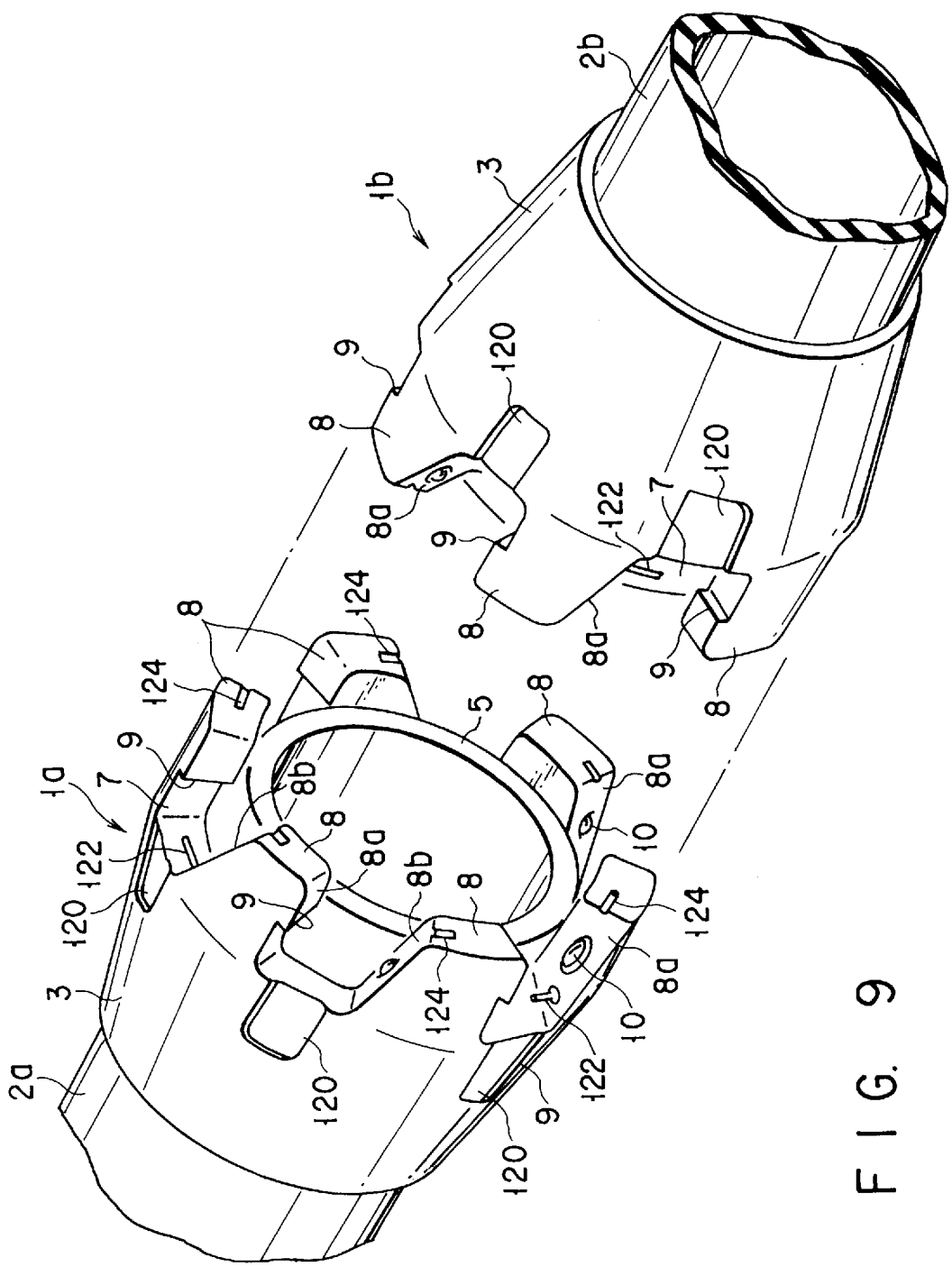
FIG. 9 is a perspective view of a sixth embodiment of the invention.
Figure 10:
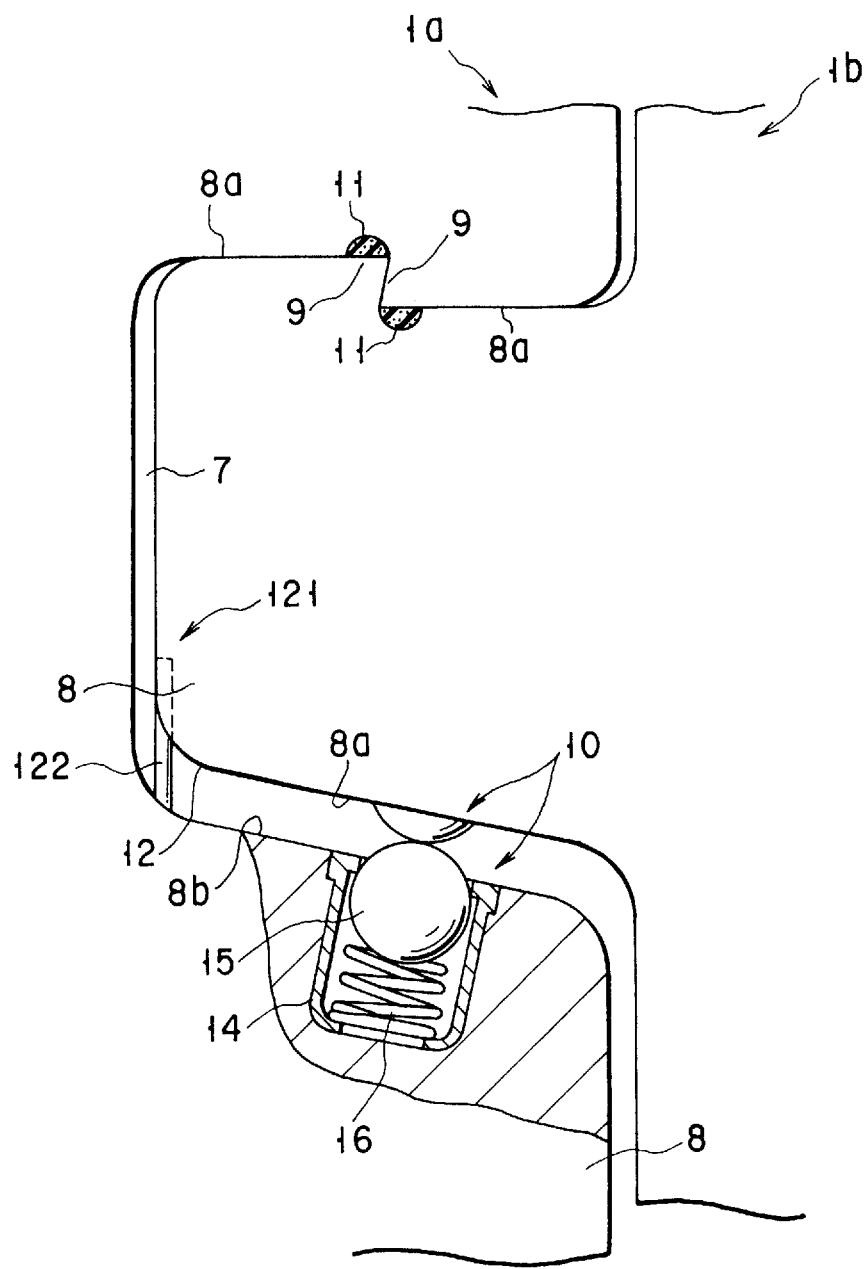
FIG. 10 is a partial plan view of the sixth embodiment.

FIGS. 9 through 14 show a sixth embodiment of the invention provided with such locking mechanisms. FIG. 9 is a perspective view of the sixth embodiment. As described earlier, each of the engaging projections 8 is provided on its first lateral side with a hooked anchor section 9 that come into peripherally engagement with the hooked anchor section 9 of the mated engaging projection 8. Thus, if the engaging projections 8 of the coupling main bodies 1a and 1b are axially in mesh and the main bodies are rotated relative to each other to bring the first lateral sides of the mated engaging projections 8 close to each other, their hooked anchor sections 9 come into mutual engagement as shown in FIG. 10 to hold the coupling main bodies 1a and 1b together.

Each of the hooked anchor sections 9 is provided at a base area thereof with a curved dent 11 to prevent accumulation of stress from occurring there. Additionally, each of the engaging projections 8 is provided at the front end corner of the second lateral side with an arcuate guide section 12 that abuts the corresponding guide section 12 of the mated engaging projection 8 when they come into mutual engagement. Still additionally, the curved dent 11 is filled with an elastic plug member 11a that is made of a soft, elastic and foamed material and secured to the dent in order to prevent foreign objects such as sand and dirt for being deposited there to obstruct the mutual engagement of the hooked anchor sections 9.

Furthermore, the hooked anchor section 9 of each of the engaging projections 8 is overhanging from the peripheral surface of the engaging projection 8 by a given angle so that the mated hooked anchor sections 9 are even more strongly engaged with other when the coupling main bodies 1a and 1b are subjected to a load trying to separate them from each other that may be internal pressure of the coupling.

Note that this embodiment is so dimensioned that a gap is produced between the top wall of each of the engaging projections 8 and the bottom wall of the corresponding engaging recess 7 when the mated hooked anchor sections 9 are engaged with each other. Thus, when the mated hooked anchor sections 9 are in mesh, the engaging projections 8 and the corresponding engaging recesses 7 be axially moved further until the oppositely disposed walls abut each other.

The second lateral side of each of the engaging projections 8 is inclined relative to the axial line of the coupling main bodies 1a and 1b. In other words, each of the engaging projections 8 is tapered and the peripheral width is gradually reduced toward the front end and each of the engaging recesses 7 has a corresponding tapered profile with a peripheral width that is gradually reduced toward the bottom so that engaging projections 8 and the engaging recesses 7 may become mutually engaged with ease. The first lateral sides of the engaging projections 8 are substantially parallel to the axis of the coupling main bodies 1a and 1b.

Still additionally, each of the engaging projections 8 is provided on the second lateral side with an urging mechanism 10 comprising a cylindrical case member 14, a steel ball 15 protrusibly housed in the case member 14 and a spring for urging the steel ball 15 to protrude, said urging mechanism 10 being buried in the second lateral side of the engaging projection 8. Thus, as the engaging projection 8 is received by the corresponding engaging recess 7 for mutual engagement as shown in FIG. 3, the urging mechanism 10 of engaging projection 8 and that of the adjacent engaging projection 8 located at the second lateral side push each other to urge them to separate the engaging projections 8 from each other so that consequently the first lateral side of the engaging projection 8 comes closer to the first lateral side of the other adjacently located engaging projection 8 and the hooked anchor sections 9 of these two engaging projections 8 come into tight engagement.

As shown in FIG. 9, each of the coupling main bodies 1a and 1b is provided on the outer peripheral surface thereof with a plurality of tool receiving recesses 120 designed for receiving a tool such as a wrench so that, if the coupling main bodies 1a and 1b become inseparable from each other because of grains of sand or some other foreign objects caught in the gaps between the two main bodies 1a and 1b, they may be forcibly released by holding them with a wrench or some other tool at the tool receiving recesses 120.

The coupling main bodies 1a and 1b are additionally provided with a locking mechanism 121 that maintains the coupling main bodies in a locked condition and prevents them from being unintendedly released from each other by impact. Now, the locking mechanism 121 will be described by referring to FIGS. 11 through 13.

Every second one of the engaging recesses 7 is provided near the bottom and on the second lateral side 8b with a lock pin 122 peripherally projecting from the second lateral side. The lock pin 122 is a member having a diameter of about 3 mm and made of a resilient material like a piano cord so that it is straight when it is free but can be resiliently bent by applying force thereto. The engaging recess 7 is additionally provided at the base of the lock pin 122 on the second lateral side with a relief hole 123 having a diameter greater than that of the lock pin 122 so that the lock pin 122 may be bent there. Note that the relief hole 123 is filled with an elastic plug member 126 that is made of a soft, elastic and foamed material.

The lock pin 122 may be arranged in each of the engaging recesses 7 or, alternatively, it may be arranged only in some of the engaging recesses 7. As described above, every other engaging recesses 7 are provided with an lock pin 122 in this embodiment. In other words, there are arranged three lock pins 122 in each of the coupling main bodies 1a and 1b.

Figure 12:
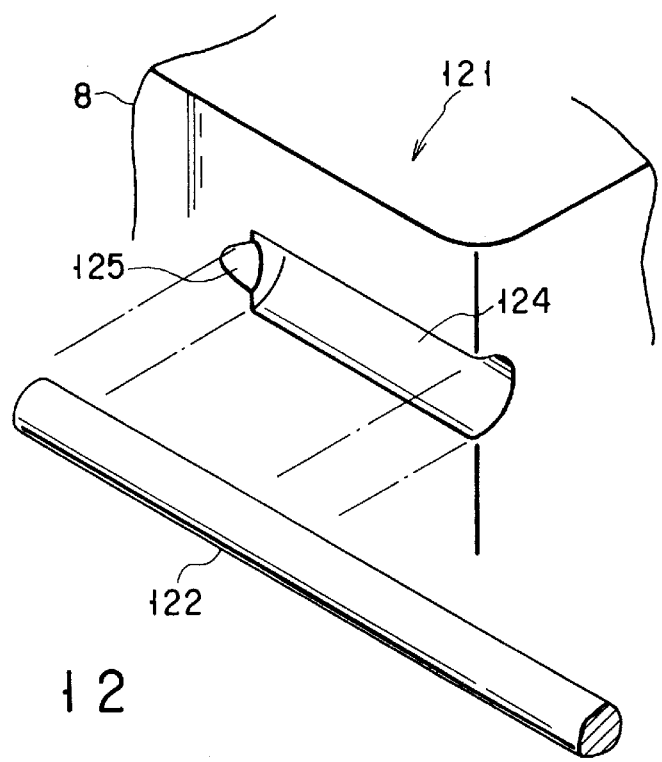
FIG. 12 is a perspective view of the locking mechanism of FIG. 11.

Every second one of the engaging projections 8 is provided at the front end thereof with a lock groove 124 corresponding to the oppositely disposed lock pin 122. As shown in FIG. 12, the lock groove 124 is open at an end at a corner of the engaging projection 8 and closed at the other end deep in the engaging projection 8. Additionally, the lock groove 124 has a beveled section 125 on the closed end to ensure that the lock pin 122 is moved away from the lock groove 124 without fail when it is released. Note that all the engaging projections 8 are provided at the front end with a lock groove 124 so that the lock pins 122 are received by the respective lock grooves 124 without fail regardless of the mutual positional relationship of the engaging projections 8 and the engaging recesses 7.

Figure 11:
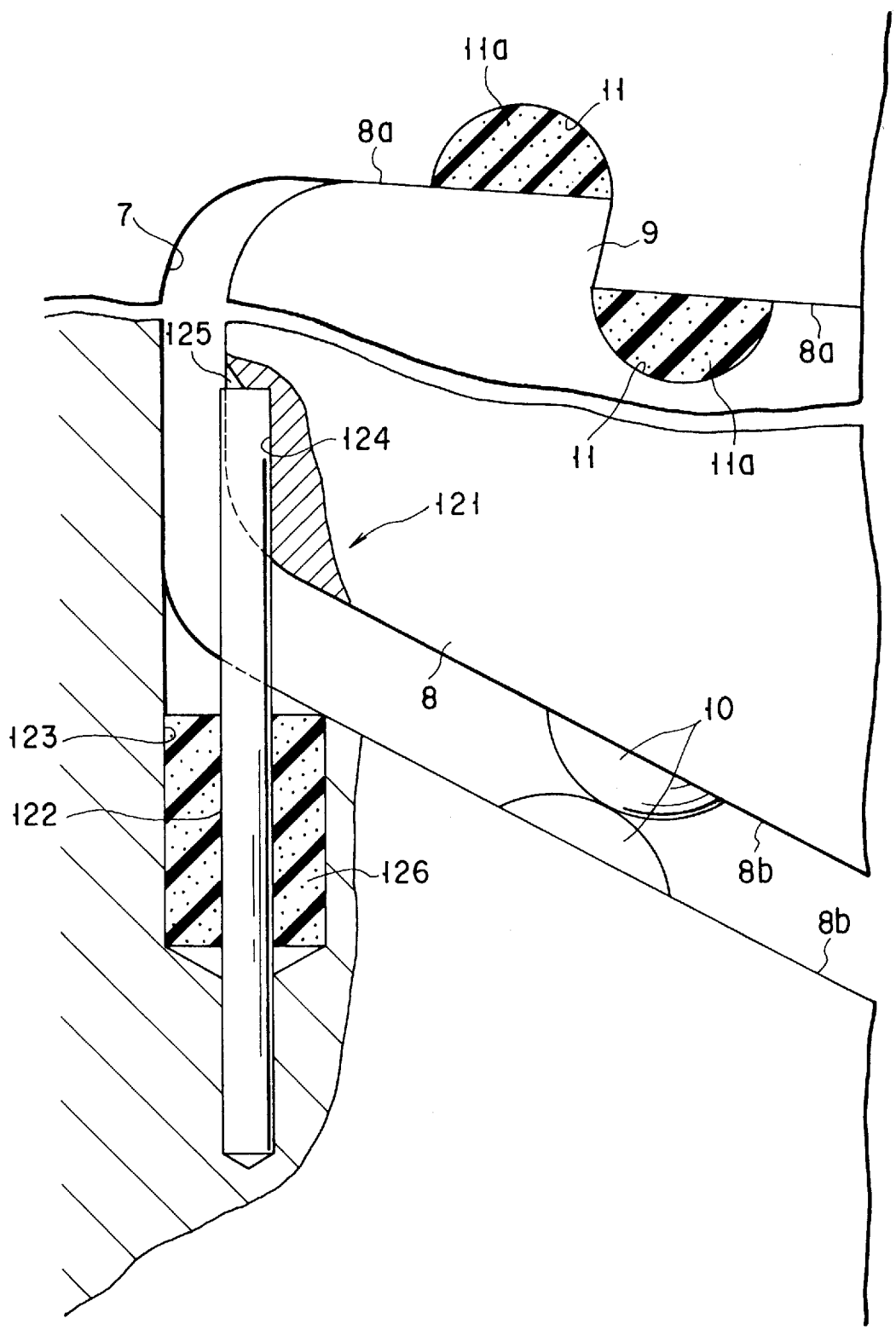

As the engaging projections 8 are received by the respective engaging recesses 7 and the mated hooked anchor sections are mutually engaged, the lock pins 122 are received by the respective lock grooves 124 on the front ends of the related engaging projections 8 and the front end of the lock pins 122 abut the closed ends of the respective lock grooves 124 as shown in FIG. 11. Under this condition, the coupling main bodies 1a and 1b are locked and peripherally unrotatable to disengage the hooked anchor sections 9.

Figure 13:
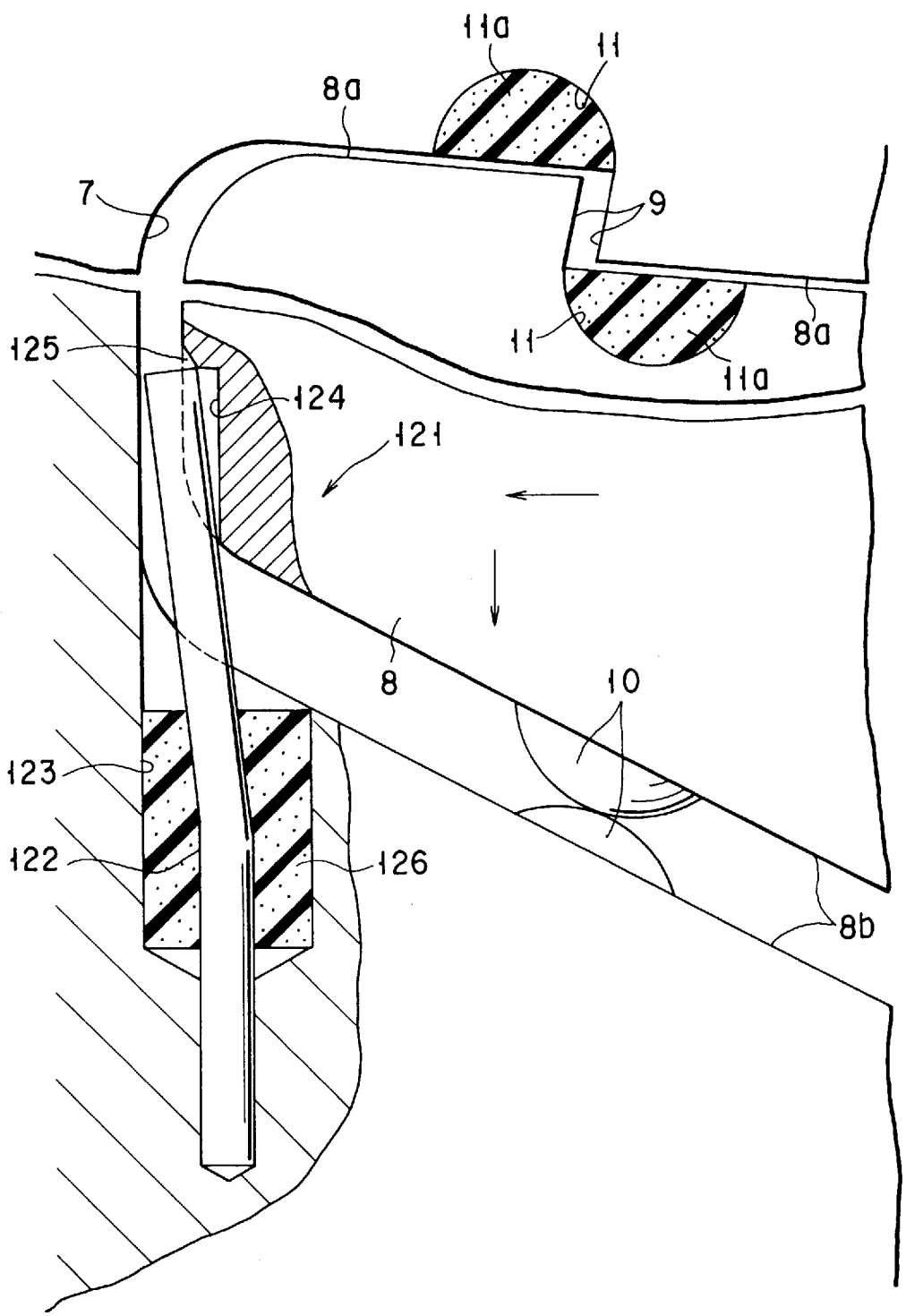
FIG. 13 is a partial plan view of the locking mechanism an unlocked state.

For releasing the locking mechanism 121, the coupling main bodies 1a and 1b are axially moved to come closer to each other so that the engaging projections 8 are axially moved toward the bottoms of the respective engaging recesses 7 until the lock pins 122 are pushed and resiliently bent by the front ends of the corresponding engaging projections 8 as shown in FIG. 13. Consequently, the front ends of the lock pins 122 are moved away from the closed ends of the corresponding lock grooves 124 to make the coupling main bodies 1a and 1b peripherally rotatable. The engagement of the hooked anchor sections 9 is canceled by rotating the coupling main bodies 1a and 1b under this condition and the coupling main bodies 1a and 1b can be separated from each other. Since each of the lock grooves 124 is provided at the closed end with a beveled section 125, the corresponding lock pin 122 can be removed smoothly from lock groove 124 without being accidentally caught by the closed end of the lock groove 124.

Figure 14:
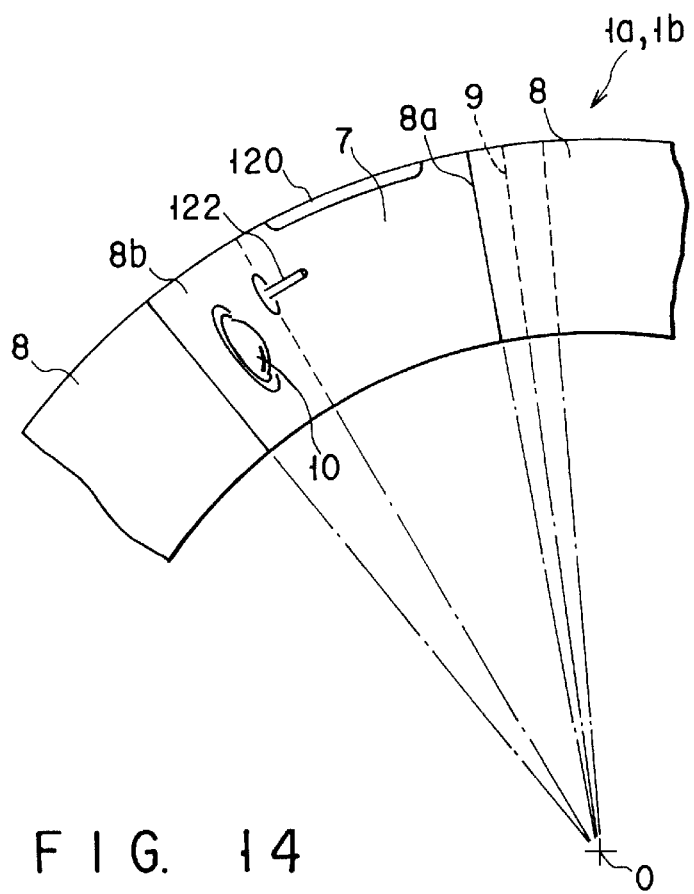
FIG. 14 is a partial front view of one of the coupling main bodies of the embodiment of FIG. 9.

Note here that the all the lateral sides of the engaging projections 8 and the engaging recesses 7 are formed by radial planes passing through the central axis of the coupling main bodies 1a and 1b. More specifically, as shown in FIG. 14, the first and second lateral sides 8a and 8b of each of the engaging projections 8 (the lateral sides of each of the engaging recesses 7) and the lateral side of the hooked anchor section of each of the engaging projections 8 are defined by radial planes passing through the central axis O of the coupling main bodies 1a and 1b.

The above embodiment of coupling operates in a manner as described below. For connecting the coupling main bodies 1a and 1b, they are coaxially placed vis-a-vis as shown in FIG. 9 and brought close to each other until the engaging projections 8 are received by the respective engaging recesses 7. Since all the six engaging projections 8 of each of the coupling main bodies 1a and 1b have an identical profile and arranged at regular intervals, they can be successfully received by the engaging recesses 7 of the other coupling main body regardless of their angular positions. In other words, they can be brought into engagement with the corresponding engaging recesses 7 by rotating the coupling main bodies 1a and 1b by about 30° at most relative to each other so that the fire fighting hoses 2a and 2b connected to the respective coupling main bodies 1a and steel ball 15 do not have to be subjected to excessive twisting motion to bring the main bodies 1a and 1b into mutual engagement.

As the engaging projections 8 are pushed deeper into the corresponding engaging recesses, the front end corners of the first lateral sides 8a or the second lateral sides 8b of the mated engaging projections 8 abut each other. Since the second lateral sides 8b are inclined and their front end corners are provided with respective guide sections 12, the engaging projections 8 are guided smoothly and surely into mutual engagement. As the mated engaging projections 8 come into axial engagement, the steel balls 15 of the urging mechanisms 10 arranged on their second lateral sides 8b press each other to urge the corresponding first lateral sides 8a to come close to each other. Once the hooked anchor sections 9 of the oppositely disposed first lateral sides 8a override the respective front ends of the hooked anchor sections 9, hooked anchor sections 9 become peripherally engaged with each other under the urging force of the urging mechanisms 10 to hold the coupling main bodies 1a and 1b together and axially immovable as shown in FIG. 10. Note that the sealing members 6 are pressed and deformed to a certain extent to ensure their sealing effect as described earlier.

The mutual engagement of the coupling main bodies 1a and 1b is affected by the urging force of the urging mechanisms 10 and other forces including the reactive force exerted by the lateral sides 8a and 8b and the hooked anchor sections 9 that abut each other. In the above embodiment, all the lateral sides 8a and 8b of the engaging projections 8 and the lateral sides of the hooked anchor sections 9 are defined by radial planes passing through the central axis O of the coupling main bodies 1a and 1b and, therefore, the counter force and other forces applied to these members have significance only in the axial direction. No components of force trying to radially displace the coupling main bodies 1a and 1b relative to each other are generated when they are mutually engaged. Thus, the coupling main bodies 1a and 1b are subjected only to radial and peripheral forces to ensure smooth mutual engagement when they are coupled together and, therefore, they would not be displaced for axial misalignment nor inclined relative to each other.

Additionally, although complex reactive force may be produced among the second lateral sides 8b that are inclined relative to the axial line of the coupling main bodies 1a and 1b and the urging force of the urging mechanisms 10 arranged on the inclined lateral sides 8b may also be complicated, only the axial and peripheral components of such forces have significance and hence the mutual engagement of the coupling main bodies 1a and 1b can be carried out smoothly and surely because the second lateral sides 8b are defined by radial planes.

Note that the smoothness of engagement and disengagement of the coupling main bodies 1a and 1b is affected by the relative profiles and dimensions of the engaging projections 8, the engaging recesses 8 and the gaps between them. However, the fact that only the axial and peripheral components of various forces have significance greatly contribute to smooth engaging and disengaging operations of the coupling main bodies of a coupling according to the invention, although a number of prototypes will have to be tested to optimize these design variables for particular applications.

As the mated hooked anchor sections 9 come into engagement in a manner as described above, the coupling main bodies 1a and 1b are locked and become peripherally immobile by the locking mechanism 121 so that they would not be unintendedly disengaged from each other if the coupling is subjected to an impact or load given rise to by twisted hoses that are connected to them.

For disengaging the connected coupling main bodies 1a and 1b, they are axially pushed to come close to each other and release the locking mechanism 121 and then rotated in opposite directions relative to each other against the urging force of the urging mechanisms 10 until the mutual engagement of the hooked anchor sections 9 is relinquished. Then, the coupling main bodies 1a and 1b are separated from each other by axially pulling them apart.

FIG. 15 is an enlarged partial plan view of a seventh embodiment of the invention, showing the locking mechanism thereof. Each of the hooked anchor sections 9 of this embodiment is provided with a projection 9a. With such an arrangement, the engagement of the coupling main bodies 1a and 1b is not relinquished unless they are axially moved by a given distance to come close to each other so that any unintended disengagement of the coupling main bodies 1a and 1b is prevented for certain by the combined effect of the locking mechanism 121 and the hooked anchor sections 9. Since this embodiment is otherwise identical with the sixth embodiment, its components are respectively denoted by the same reference symbols as those of the sixth embodiment and will not be described any further.

Figure 16:
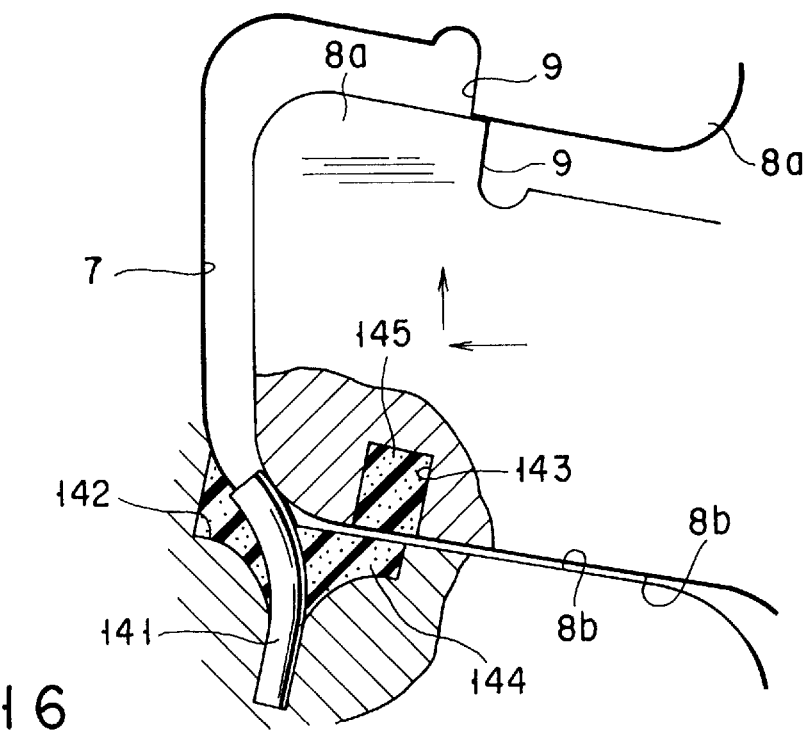
FIG. 16 is an enlarged partial plan view of an eighth embodiment of the invention, showing the locking mechanism thereof.
Figure 17:
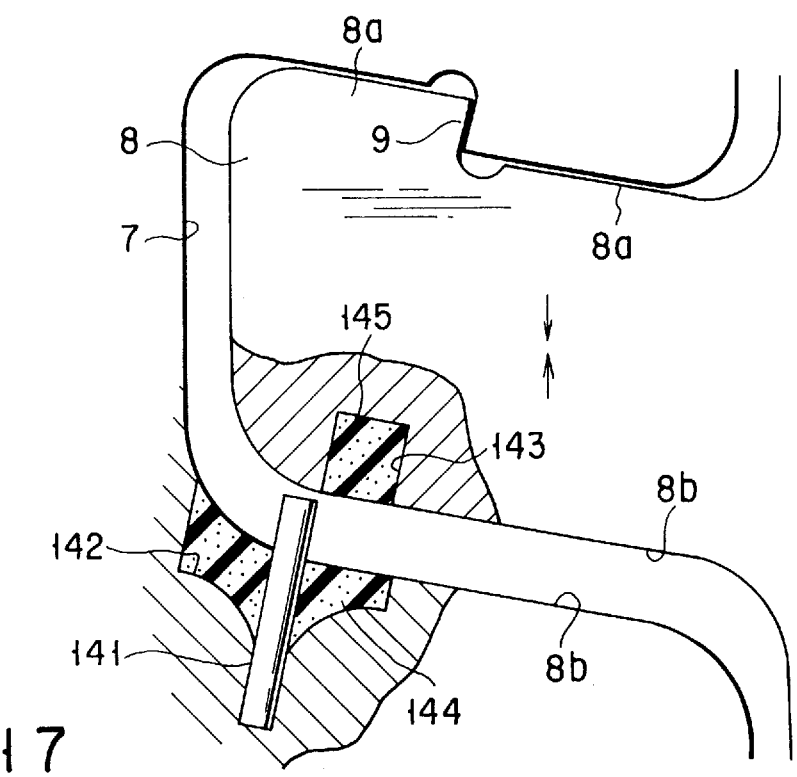
FIG. 17 is an enlarged partial plan view of the eighth embodiment of the invention similar to FIG. 16 but showing the locking mechanism thereof in a different state.

FIGS. 16 through 18 shows the locking mechanism of an eighth embodiment of the invention. All or selected ones of the engaging recesses 7 is provided near the bottom and on the second lateral side 8b with a lock pin 141 peripherally projecting from the second lateral side. The lock pin 141 is made of a superelastic material having a large Young's modulus and straight when it is free but can be resiliently bent by applying force thereto. The engaging recess 7 is additionally provided near the bottom with a relief recess 142 having a large diameter so that the lock pin 141 may be bent there.

The corresponding engaging projection 8 is provided at a front end portion of the second lateral side 8b thereof with a release hole 143. The location of the release hole 143 does not agree with that of the front end of the lock pin 141 but they are located close to each other when the hooked anchor sections 9 are in mutual engagement. Note that both the relief recess 142 and the release hole 143 are filled respectively with elastic plug members 144 and 145 that is made of a soft, elastic and foamed material to prevent from being deposited by foreign objects such as sand or dirt. Since this eighth embodiment is otherwise identical with the sixth embodiment, its components in FIGS. 16 through 18 are respectively denoted by the same reference symbols as those of the sixth embodiment and will not be described any further.

When the coupling main bodies 1a and 1b are put together for mutual engagement, the lock pins 141 are bent to allow the engaging projections 8 to be received by the corresponding engaging recesses 7 as shown in FIG. 16. As the mated hooked anchor sections 9 are fully engaged with each other, the lock pins 141 are restored to the straight state by the own resilience. and their front ends abut the respective second lateral sides 8b of the corresponding engaging projections 8 to unrotatably lock the coupling main bodies 1a and 1b as shown in FIG. 17.

For releasing the locking mechanism, the coupling main bodies 1a and 1b are pushed to come close to each other so that the front end of each of the lock pins 141 is located vis-a-vis the corresponding release hole 143 as shown in FIG. 18. Then, the front ends of the lock pins 141 can enter the respective release holes 143 to make the coupling main bodies 1a and 1b peripherally rotatable relative to each other to release the locking mechanism as shown in FIG. 18.

Figure 19:
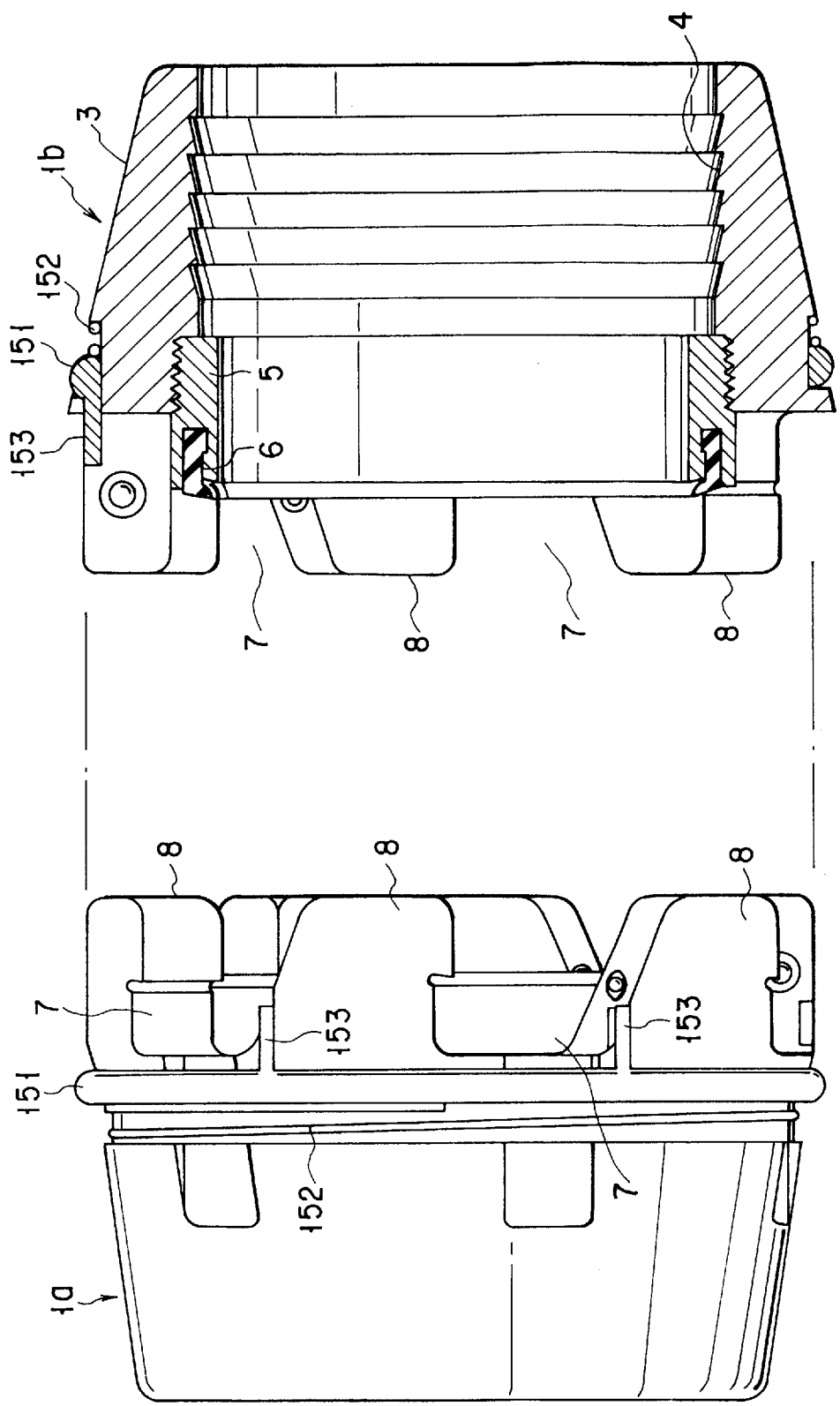

FIG. 19 is a partially cut away lateral view of a ninth embodiment of the invention, showing a part thereof in longitudinal cross section. The coupling main bodies 1a and 1b of this embodiment are provided with respective annular lock members 151 that are axially slidable. The lock members 151 are axially urged to move toward the front ends of the coupling main bodies 1a and 1b by respective springs 152.

Each of the lock member 151 is provided at the front end with a lock claw 153 projecting into the corresponding engaging recess 7. The lock claws 153 have a width slightly smaller than the gap formed between the second lateral sides 8b of each pair of mated engaging projections 9 when the engaging projections 8 are received by the respective engaging recesses 7 and the mated hooked anchor sections 9 are fully engaged with each other. Since this ninth embodiment is otherwise identical with the sixth embodiment, its components in FIG. 19 are respectively denoted by the same reference symbols as those of the sixth embodiment and will not be described any further.

When the coupling main bodies 1a and 1b are put together for mutual engagement, the front ends of the lock claws 153 abut and pushed back with the lock members 151 by the front ends of the engaging projections 8 against the urging force of the springs 152. When the engaging projections 8 are fully received by the respective engaging recesses 7 and each pair of mated hooked anchor sections are completely engaged with each other to produce a given gap on each of the lateral sides 8b, the lock claws 153 are moved forward by the urging force of the springs 152 to go into the respective gaps and unrotatably lock the coupling main bodies 1a and 1b. For releasing the locking mechanism, the lock members 151 are moved away from each other by hand against the urging force of the springs 152 until the lock claws 153 are pulled out of the gaps on the respective second lateral sides 8b.

The locking mechanism and the locked or unlocked condition of the coupling main bodies 1a and 1b of this embodiment are visible from outside so that it can be reliably operated for mutual engagement or disengagement. Additionally, it is structurally simple and reliable and can be operated with ease.

A plunger mechanism as shown in FIGS. 20 through 22 can be used as an urging mechanism 10 for the purpose of the invention.

FIG. 20 is a longitudinal sectional view of the plunger mechanism, FIG. 21 is a front view of the plunger mechanism and FIG. 22 is a perspective view of the viscous body of the plunger mechanism. The plunger mechanism comprises a plunger main body 211 that is a cylindrical member having an opening 212 at an end and made of metal. The plunger main body 211 is additionally provided at the opening 212 with an internally projecting flange 213. The plunger mechanism also comprises a steel ball 214 disposed in the main body 11 and protrusible through the opening 212. The inner diameter of the flange 212 is slightly smaller than the diameter of the steel ball 214 so that the latter cannot totally come out of the opening 212 although it may partly protrude from the opening 212.

An axially expandable coil spring 215 is housed in the plunger main body 211. It is held at an end to the bottom of the plunger main body 211 and abuts the ball 214 at the opposite end to urge the latter to protrude from the opening 212.

The internal space of the coil spring 215 is filled with a viscous member 216. The viscous member 216 may be a dilatant fluid material or a viscous fluid material such as a pasty silicon-bound fluid compound filled in an elastic cylindrical bag 217 typically made of rubber. The viscous member 216 is deformed easily when the plunger main body 211 and the ball 214 are moved slowly (at low speed) relative to each other because it shows little resistance but becomes highly rigid when they are moved quickly (at high speed) relative to each other because of a progressive non-linear rise of its apparent viscosity.

Figure 23:
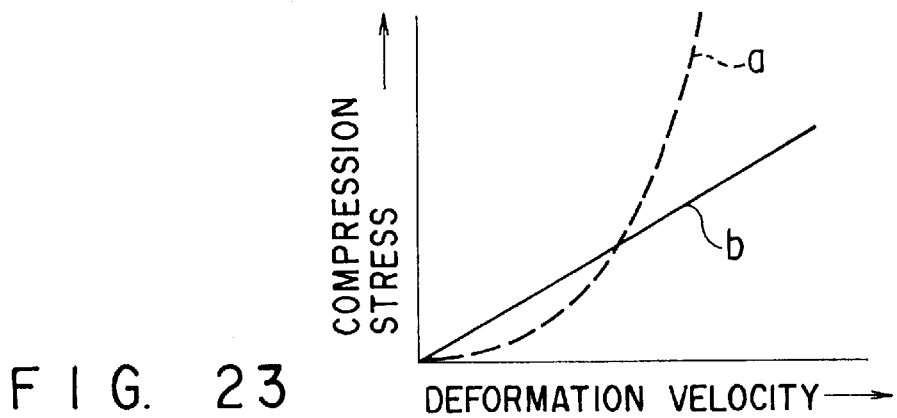
FIG. 23 is a graph illustrating the performance of the plunger FIG. 20.

The dilatant fluid material of the viscous member 216 is a non-Newtonian fluid that is independent of elapse of time. The curve a in FIG. 23 illustrates a typical relationship between the compression stress and the deformation speed of such a fluid. As seen from FIG. 23, the apparent viscosity rises rapidly as the deformation speed increases to prove its dilatant fluidity. The curve b in FIG. 23 is the comparable relationship of a Newtonian fluid. The phenomenon as illustrated by the curve a is specific to rheologic fluid that is essentially different from repulsively plastic fluid. In dilatant fluid, the fluid operates as lubricant for the solid particles passing therethrough so that little force is required for the plunger main body 211 and the ball 214 to start a relative movement at low speed. In other words, the dilatant fluid flows freely. If the plunger main body 211 and the ball 214 move quickly relative to each other, on the other hand, the densely filled state of solid particles is destructed to increase the volume of the material.

Thus, when the ball 214 is pushed into the plunger main body 211 at low speed, the viscous member 216 is deformed by the compressed coil spring 215 to allow the relative movement of the plunger main body 211 and the ball 214. When, to the contrary, the ball 214 is pushed into the plunger main body 211 at high speed under the effect of large impact, the compression stress of the viscous member 216 (the stress generated by the force applied to the viscous member 216 to compress the latter) becomes very large to give rise to a reactive force (due to the rigid Young's modulus) to be applied to the moving ball 214 so that the movement of the ball 214 is restricted and the ball 214 does not move further into the plunger main body 211, compressing the coil spring 215.

When such plunger mechanisms are used for the urging mechanisms 10 of a coupling according to the invention, they generate large resistance against the relative rotation that may be produced if the coupling is subjected to large impact that tends to instantaneously rotate the coupling main bodies 1a and 1b relative to each other. Consequently, the coupling main bodies 1a and 1b are prevented from rotating relative to each other to unintendedly relinquish the engagement of the hooked anchor sections 9.

A plunger mechanism of the type as described above can be used not only as anti-impact locking mechanism for a coupling of the type under consideration but also for various applications.

Figure 24:
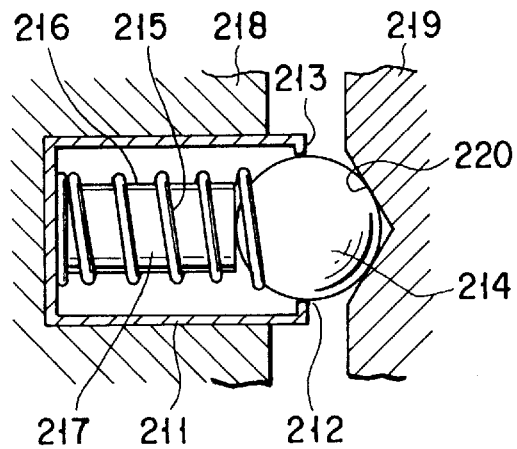
FIG. 24 is a longitudinal sectional view of the plunger of FIG. 20 held in position.

For example, an anti-impact plunger mechanism of the above described type may be used as a device for binding a fixed metal mold half and a movable metal mold half, as a coupling, as a jig for determining drilling locations, as a torque limiter and as a mechanical device for indexing the angle of rotation of a turn table as well as for a number of different applications. A first member 218 and a second member 219 may be resiliently coupled by securing a plunger main body 211 to the first member 218 and arranging a conical engaging recess 220 is on the second member 219 and establishing a resilient engagement of the ball 214 and the engaging hole 220 as illustrated in FIG. 24.

Then, if the ball 214 is subjected to large impact to urge it into the inside of the plunger main body 211 at high speed while the first and second members 218 and 219 are in mutual engagement, the compression stress of the viscous member 216 is increased greatly to give rise to a large reactive force (due to the rigid Young's modulus) that tries to block the ball 214 and prevent it from moving any further. Consequently, the ball 214 does not move into the plunger main body 211 to compress the coil spring 215 so that the first and second members 218 and 219 maintain their engaged state.

Figure 25A:
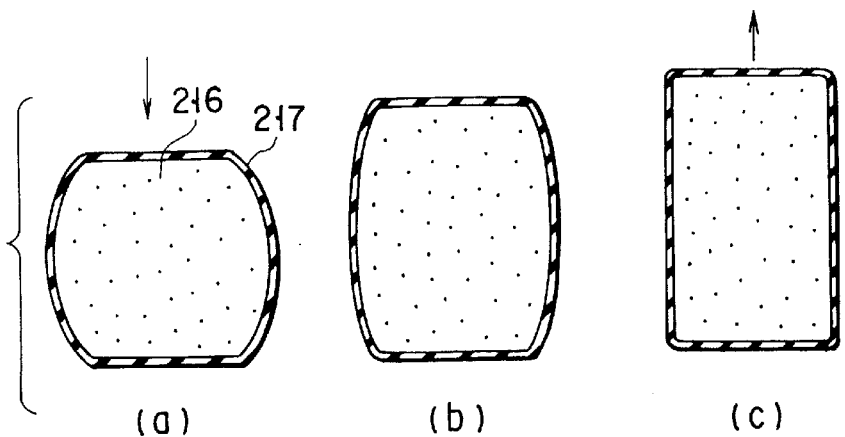
FIGS. 25A to 25C are views of various viscous bodies that can be used for the purpose of the invention, illustrating how they work.

The viscous member 216 comprising a viscous and resilient fluid such as a dilatant fluid material or a pasty silicon-bound fluid material filled in the elastic cylindrical bag 217 as referred to above will be described in greater detail. The viscous member 216 in fact comprises "a non-compressible fluid" that does not substantially change its volume if subjected to high pressure. When a viscous member 216 is filled in an elastic cylindrical bag 217 as shown in FIG. 25A, it shows a profile as shown by (a) if no external force is applied thereto. If subjected to external force applied in the axial direction of the arrow as shown by (b), it is axially compressed but does not change its volume. Additionally, since the viscous member 216 is not resilient, it does not axially extend and radially narrowed unless external force is applied to axially pull it in the direction of the arrow as shown by (c).

Figure 25B:
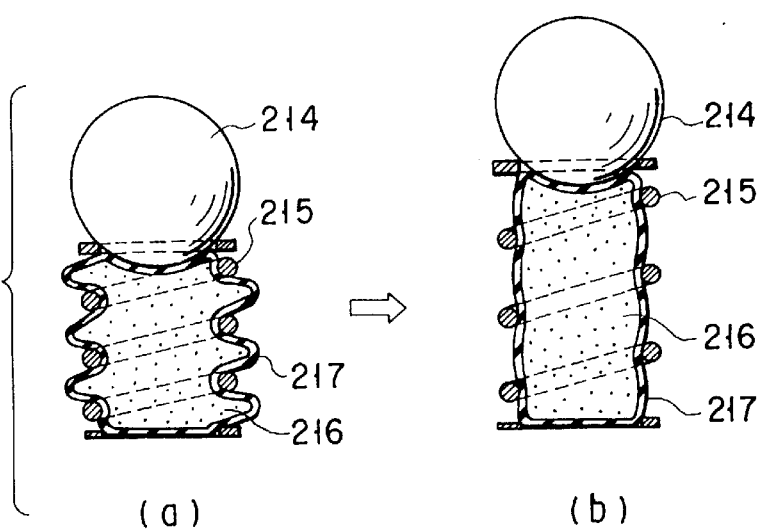

Thus, when the internal space of the coil spring 215 is filled with the viscous member 216 as shown in FIG. 25B and external force is applied to the ball 214 to compress the coil spring 215 as shown by (a), the internal viscous member 216 is axially compressed along with the coil spring 215 and the elastic bag 217 is radially extended to the outside through the helix of the coil spring 215. If, on the other hand, the external force applied to the ball 214 is removed, the elastic bag 217 is axially extended by the resilient force of the coil spring 215 to reduce its radial dimension as shown by (b).

Figure 25C:
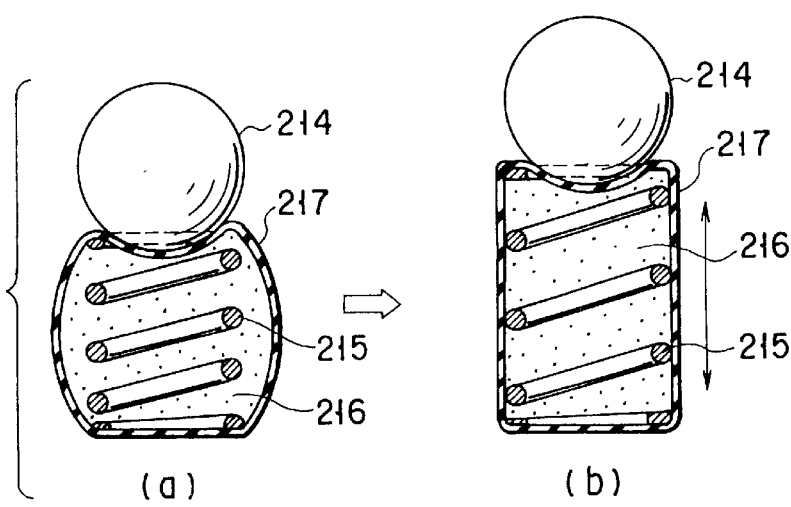

A same effect can be obtained if the coil spring 216 is contained in the elastic cylindrical bag 217 of rubber along with the viscous member 216 as shown in FIG. 25C. When external force is applied to the ball 214 to compress the coil spring 215 as shown by (a), the viscous body 216 is also compressed along with the coil spring 215 to radially extend the elastic bag 217 so that the coil spring 215 is separated from the peripheral wall of the bag. If the external force applied to the ball 214 is removed, the elastic bag 217 is axially extended by the resilient force of the coil spring 215 to reduce its radial dimension.

Thus, the elastic bag 217 containing the viscous member 216 may be arranged inside the coil spring 215 or, alternatively, the coil spring 215 may be arranged in the elastic bag 217 along with the viscous member 216.

Note that the elastic bag 217 containing the viscous member 216 may be replaced by an elastic cylindrical body of sponge or the like soaked with a dilatant fluid material or a pasty silicon-bound fluid material.

Figure 26:
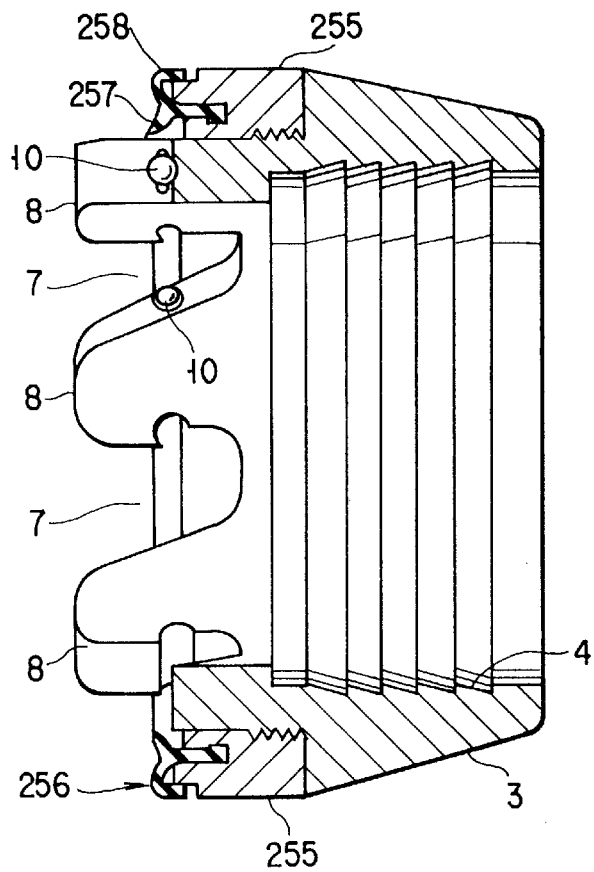
FIG. 26 is a longitudinal sectional view of one of the coupling main bodies of an eleventh embodiment of the invention.

FIG. 26 shows an eleventh embodiment of coupling according to the invention. In this embodiment, each of the tube main bodies 3 is provided with an external sealing member 255 arranged on the outer periphery thereof and having its front end surface operating as a sealing surface and an annular sealing member 256 is fitted to the front end.

Thus, the sealing member 256 is arranged on the outer peripheral surface of the engaging projections 8 and the engaging recesses 7 in this embodiment. When the coupling main bodies 1a and 1b are connected together, the engaging projections 8 are protected by the sealing members 256 of the two main bodies to prevent foreign objects such as sand and dirt from entering and being caught by the gaps between the engaging projections.

Each of the sealing members 256 are provided with a lip section 257 for airtight sealing and a boot section 258 having a U-shaped cross section for preventing foreign objects such as sand and dirt from entering the coupling.

Figure 27:
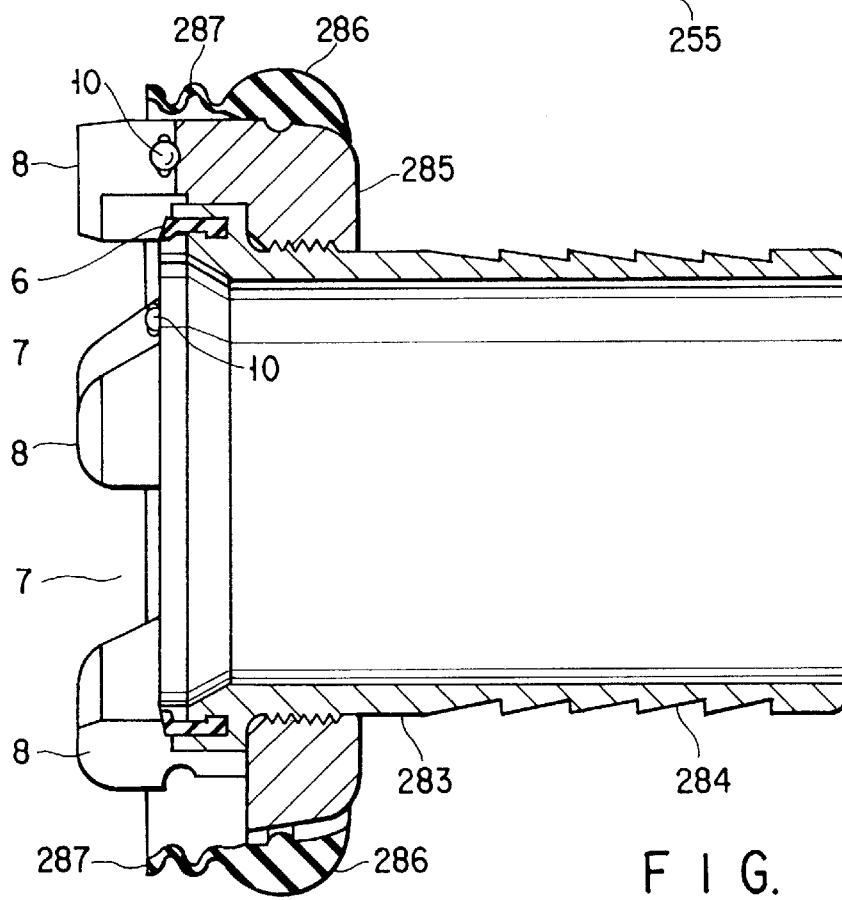
FIG. 27 is a longitudinal sectional view of one of the coupling main bodies of an eleventh embodiment of the invention.

FIG. 27 shows a twelfth embodiment of coupling according to the invention. Each of the tube main bodies 3 of this embodiment is provided on the outer peripheral surface thereof with a hose fitting section 284 having a plurality of projections in the form of indentation. A hose (not shown) is tightly fitted to the outside of this hose fitting section 284 and locked in position by a clamp ring (not shown).

Each of the tube main bodies 283 of this embodiment is additionally provided on the outer periphery thereof with a ring member 285 screwed onto it. The engaging projections 8 and the engaging recesses 7 of the coupling main body is in fact arranged on the front end of this ring member 285. The ring member 285 is provided on the outer periphery thereof with a boot member 286 for preventing foreign objects from being caught by the gaps of the engaging projections 8. The boot member 286 is substantially cylindrical and has a bellows section 257 arranged at the front end thereof.

Now, a method of machining the coupling main bodies 1a and 1b having a profile illustrated in FIG. 14 will be described by referring to FIG. 28.

The lateral sides of the engaging projections 8 and the engaging recesses 7 of the coupling main bodies 1a and 1b are defined by radial planes passing through the central axis of the coupling main bodies 1a and 1b. For producing the engaging projections 8 and the engaging recesses 7, the front end surface of each of the coupling main bodies 1a and 1b is worked with a milling machine or the like but the use of an ordinary milling machine will be inadequate because all the lateral sides will be formed in parallel with each other with such a machine.

Figure 28:
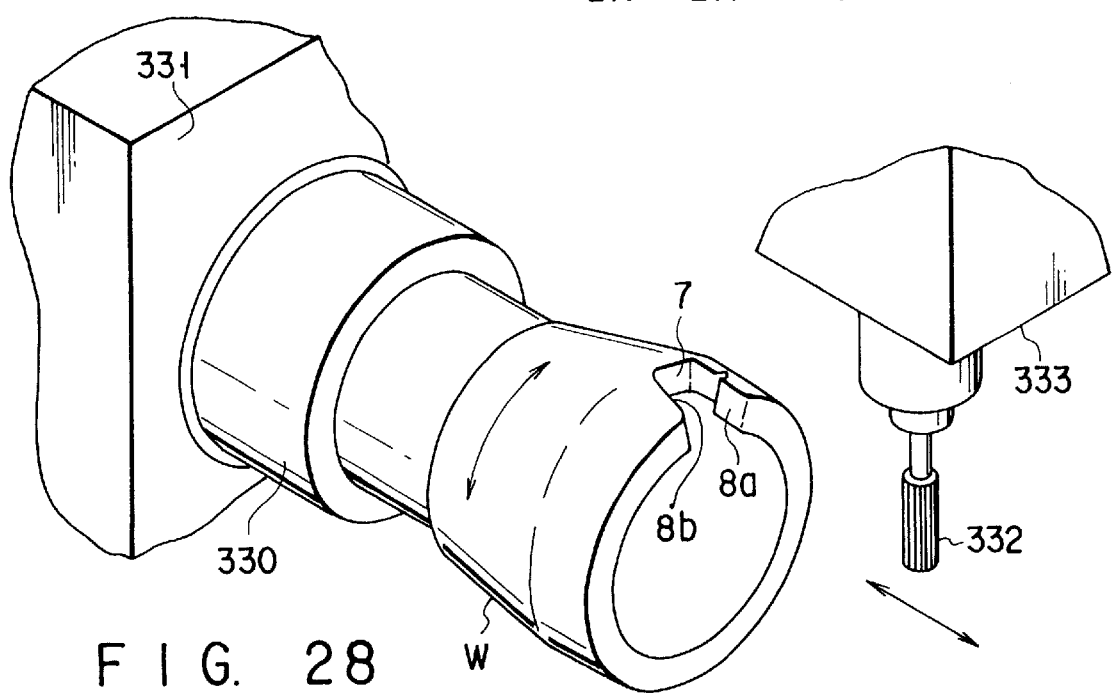
FIG. 28 is a perspective view of a coupling main body, illustrating how it is machined.

This problem is solved by using a cutting method as illustrated in FIG. 28. Firstly, a substantially cylindrical work W for producing a pair of coupling main bodies 1a and 1b is fitted to a work holding member 330 of a work holding bed mechanism 331. A work holding bed mechanism 331 is designed to rotate the work A around its central axis which is referred to as X-axis or A-axis by any given angle. The bed of any known milling machine can be used for it. Then, a milling cutter 332 is fitted to the milling head 333 of the machine in such a manner that it intersects the X-axis of the work W. The tool head 333 can move the milling cutter 332 along the central axis of the work W. Again, the machining head of any known milling machine can be used for it.

The milling cutter 332 is moved axially, while rotating the work W, so that the cutting point of the milling cutter 332 moves along the profile of each of the engaging recesses 7 (or the engaging projections 8) to produce an engaging recess 7 at the front end of the work W along with lateral sides 8a and 8b and a hooked anchor sections 9 for it.

When the engaging recess 7 is formed, the work W is rotated by a given angle for cutting the next engaging recess 7. The milling operation is continued until all the engaging recesses 7 or the engaging projections 8 are produced.

When the central axis of the milling cutter 332 is made to radially agree with a line intersecting the central axis of the work W for the actual milling operation, the cutting point of the milling cutter 332 is peripherally displaced by a distance equal to the radius of the milling cutter 332. For cutting the second lateral side 8b that is inclined relative to the X-axis of the work W or an arcuate line with the milling cutter 332, the peripheral displacement of the cutting point is further changed. The milling head 333 is designed to be movable along the Y-axis that is perpendicular to the X-axis of the work W in order to compensate such displacements that may be given rise to by the displacement of the milling cutter 332 in radial and/or cutting directions.

With the above described machining method, the cutting point of the milling cutter 332 is always directed to the central axis of the work W when the lateral sides 8a and 8b are cut so that these sides can be defined by planes passing through the central axis of the coupling main bodies. Additionally, the above described machining method can be used with existing facilities or minimal modifications to existing facilities to reduce the manufacturing cost.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A coupling for coupling hoses or a hose and another device, comprising:
    a pair of coupling main bodies;
    a pair of sealing members formed on the front end surfaces of the respective coupling main bodies for axial abutment; and
    a plurality of engaging projections arranged on the front end of each of the coupling main bodies and axially projecting and engaging recesses, each being defined by adjacent two engaging projections;
    said engaging projections and said engaging recesses of the coupling main bodies being so designed as to be axially and complementarily engaged with the corresponding engaging recesses and the engaging projections of the other coupling main bodies;
    each of said engaging projections of the coupling main bodies being provided with a hooked anchor section for peripheral engagement with the corresponding one of said engaging projections of the other coupling coupling main bodies to restrict axial movement of said engaging projections, thereby axially holding the coupling main bodies together;
    said engaging projections and said engaging recesses of the coupling main bodies are so designed as to be axially and complementarily engaged with the corresponding engaging recesses and the engaging projections of the other coupling main body and peripherally rotatable relative to each other to a predetermined extent;
    said engaging projections, each having first and second opposing lateral sides, said first lateral sides provided with respective hooked anchor sections designed to be peripherally engaged with the corresponding hooked anchor sections of the other coupling main body to restrict axial movement of said engaging projections relative to each other, thereby axially holding the coupling main bodies together; and
    said engaging projections are provided on said second lateral sides thereof with respective urging mechanisms for resiliently urging the second lateral sides of the engaging projections of the other coupling main bodies to separate the respective second lateral sides to maintain mating engagement of said hook anchor sections.

2. A coupling for coupling hoses according to claim 1, wherein each of said urging mechanisms is a plunger mechanism comprising an urging member protrusibly arranged inside each said second lateral side of the engaging projection carrying it and a spring for urging the urging member to protrude from said second lateral side.

3. A coupling for coupling hoses according to claim 1, wherein each of said urging mechanisms is an urging piece partly cut from said second lateral side of the engaging projection as an integral part thereof.

4. A coupling for coupling hoses according to claim 1, wherein:
    said engaging projections and said engaging recesses are axially engaged with the corresponding engaging recesses and the corresponding engaging projections of the other coupling main bodies to become peripherally substantially unrotatable relative to each other;
    said engaging projections are provided with respective hooked anchor members projecting peripherally from said first lateral sides; and
    said hooked anchor members are peripherally engaged with the corresponding engaging projections of the other coupling main bodies to restrict axial movement thereof, thereby axially holding the coupling main bodies together.

5. A coupling for coupling hoses according to claim 1, wherein each of said coupling main bodies comprises a sealing surface carrying member carrying said sealing surface on the front end thereof and an engaging member carrying thereon said engaging projections and said engaging recesses, said engaging member being rotatable relative to said sealing surface carrying member, one of said sealing surface carrying members being provided integrally with a hose, and another of said sealing surface carrying members being provided integrally with a device for connecting the hose.

6. A coupling for coupling hoses according to claim 1, wherein said pair of coupling main bodies being provided with electric connectors to be electrically connected to the corresponding ones of the other coupling main bodies when the latter are coupled together.

7. A coupling for coupling hoses according to claim 1, wherein:
    said coupling is provided with a locking mechanism for locking said coupling main bodies and holding them unrotatable relative to each other.

8. A coupling for coupling hoses according to claim 7, wherein said locking mechanism comprises:
    resiliently bendable lock pins arranged substantially peripherally at the bottoms of said second lateral sides; and
    lock grooves arranged at the top of said second lateral sides for receiving said lock pins, so that
        said lock pins are engagedly received by said respective lock grooves to unrotatably lock the coupling main bodies relative to each other when the coupling main bodies are coupled with each other.

9. A coupling for coupling hoses according to claim 7, wherein said locking mechanism comprises:
    resiliently bendable lock pins arranged substantially peripherally at the bottoms of said second lateral sides; and
    release holes arranged near the top of the second lateral sides for receiving said lock pins, so that said lock pins abut the second lateral sides of the corresponding engaging projection at locations near the respective release holes to unrotatably lock the coupling main bodies relative to each other when the coupling main bodies are coupled with each other and, for releasing the lock, the coupling main bodies are moved axially toward each other to align the lock pins with the respective release holes to permit uncoupling of the main bodies.

10. A coupling for coupling hoses according to claim 7, wherein said locking mechanism comprises:

lock members axially slidably arranged on the coupling main bodies, said lock members being urged by respective springs to move toward the front end of the coupling main bodies;

said lock members being provided with respective lock claws projecting therefrom such that, when the coupling main bodies are coupled together, said lock claws project into the respective peripheral gaps between said engaging projections and said engaging recesses to unrotatably lock the coupling main bodies relative to each other.

11. A coupling for coupling hoses according to claim 1, wherein the lateral sides of said engaging projections and the inner sides of said engaging recesses are defined by planes passing through the central axis of said cylindrical coupling main bodies.

12. A coupling for coupling hoses according to claim 11, wherein said engaging projections are tapered and the engaging recesses have a tapered profile.

13. A coupling for coupling hoses according to claim 1, wherein said sealing surfaces are located inside said engaging projections and said engaging recesses, that are peripherally arranged to surround the sealing surfaces.

14. A coupling for coupling hoses according to claim 1, wherein said sealing surfaces are located outside said engaging projections and said engaging recesses and peripherally continuously arranged to surround said engaging projections and said engaging recesses.

15. A coupling for coupling hoses according to claim 1, wherein each of said urging mechanisms is an anti-impact plunger mechanism comprising:

a cylindrical plunger main body having an opening at an end;

an engaging member arranged in the plunger main body and protrusible from said opening;

a coil spring arranged in the plunger main body and compressible along the axis of said plunger main body to urge said engaging member to protrude; and a viscous member arranged in said plunger main body to become rigid when said plunger main body and said engaging member are quickly moved relative to each other and deformed when said plunger main body and said engaging member are slowly moved relative to each other.

16. An anti-impact plunger mechanism for resiliently engaging two components and locking them to prevent them from being separated by impact, said anti-impact plunger mechanism comprising:

a cylindrical plunger main body for mounting within one of the two components having an opening at an end, and engaging member arranged in the plunger main body and protrusible from said opening and a coil spring arranged in the plunger main body and compressible along the axis of said plunger main body to urge said engaging member to protrude, said protruding engaging member being displaced relative to said plunger main body when contacted by the other component;

wherein:

a viscous member is arranged in said plunger main body to become rigid when said plunger main body and said engaging member are quickly moved relative to each other and deformed when said plunger main body and said engaging member are slowly moved relative to each other.

17. An anti-plunger mechanism according to claim 16, wherein said viscous member is a dilatant fluid material contained in an elastic bag.

18. An anti-plunger mechanism according to claim 16, wherein said viscous member is a dilatant fluid material soaked in an elastic body.

19. An anti-plunger mechanism according to claim 16, wherein said viscous member is a pasty silicon-bound fluid material contained in an elastic bag.

20. An anti-plunger mechanism according to claim 16, wherein said viscous member is a pasty silicon-bound fluid material soaked in an elastic body.

* * * * *

UNITED STATES PATENT AND TRADEMARK OFFICE
CERTIFICATE OF CORRECTION

PATENT NO. : 5,857,713
DATED : January 12, 1999
INVENTOR(S) : Akira Horimoto

It is certified that error appears in the above-identified patent and that said Letters Patent is hereby corrected as shown below:

In column 2, at line 51, after "mechanism", delete "the" and insert therefor --thereof;--.

In column 2, at line 52, delete "of;".

In column 2, at line 55, after "mechanism" insert --in--.

In column 3, at line 2, after "similar to" delete "FIG. 17"and insert therefor --FIG. 16--.

In column 3, at line 4, prior to "FIG. 18"insert --FIG. 18 is an enlarged partial plan view of the eighth embodiment of the invention similar to FIG. 17 but showing the locking mechanism thereof in still another different state.--

In column 3, at line 4, delete "FIG. 18" and insert therefor --FIG. 19--.

In column 3, at line 11, after "plunger" delete "f" and insert therefor --of--.

In column 3, at line 13, after "plunger" insert --of--.

Signed and Sealed this

Twentieth Day of July, 1999

*Attest:*

Q. TODD DICKINSON

*Attesting Officer*  *Acting Commissioner of Patents and Trademarks*